(12) United States Patent
Noma et al.

(10) Patent No.: US 12,528,453 B2
(45) Date of Patent: Jan. 20, 2026

(54) VEHICLE CONTROL APPARATUS, VEHICLE CONTROL METHOD, AND VEHICLE CONTROL SYSTEM

(71) Applicants: Hitachi Astemo, Ltd., Hitachinaka (JP); School Judicial Person Ikutoku Gakuen, Atsugi (JP)

(72) Inventors: Daisuke Noma, Hitachinaka (JP); Kentaro Ueno, Hitachinaka (JP); Makoto Yamakado, Atsugi (JP); Yoshio Kano, Atsugi (JP); Masato Abe, Atsugi (JP)

(73) Assignees: Hitachi Astemo, Ltd., Hitachinaka (JP); School Judicial Person Ikutoku Gakuen, Atsugi (JP)

( * ) Notice: Subject to any disclaimer, the term of this patent is extended or adjusted under 35 U.S.C. 154(b) by 94 days.

(21) Appl. No.: 18/566,296

(22) PCT Filed: Jun. 2, 2022

(86) PCT No.: PCT/JP2022/022517
§ 371 (c)(1),
(2) Date: Dec. 1, 2023

(87) PCT Pub. No.: WO2022/255455
PCT Pub. Date: Dec. 8, 2022

(65) Prior Publication Data
US 2024/0140399 A1     May 2, 2024

(30) Foreign Application Priority Data
Jun. 4, 2021   (JP) .................. 2021-094190

(51) Int. Cl.
*B60G 17/016*   (2006.01)
*B60W 10/18*    (2012.01)
(Continued)

(52) U.S. Cl.
CPC .......... *B60W 30/045* (2013.01); *B60W 10/18* (2013.01); *B60W 10/22* (2013.01); *B60G 17/0165* (2013.01)

(58) Field of Classification Search
CPC .... B60W 10/184; B60W 10/20; B60W 10/18; B60W 10/22; B60W 2720/14; B60W 30/045; B60W 2540/18; B60G 17/0165
See application file for complete search history.

(56) References Cited

U.S. PATENT DOCUMENTS 6,009,374 A * 12/1999 Urahashi .......... G08G 1/096872
                                                701/410
7,672,766 B2 * 3/2010 Poilbout .................. B60G 3/04
                                                701/37
(Continued)

FOREIGN PATENT DOCUMENTS

JP    2007-237917 A    9/2007
JP    2013-126821 A    6/2013
(Continued)

OTHER PUBLICATIONS

International Preliminary Report on Patentability (PCT/IB/326, PCT/IB/338 & PCT/IB/373) issued in PCT Application No. PCT/JP2022/022517 dated Dec. 14, 2023, including Japanese-language Written Opinion (PCT/ISA/237) with English translation (13 pages).
(Continued)

*Primary Examiner* — Gonzalo Laguarda
(74) *Attorney, Agent, or Firm* — Crowell & Moring LLP

(57) ABSTRACT

In one mode, with a vehicle control apparatus, a vehicle control method, and a vehicle control system according to the present invention, a control command is output for operating an actuator unit mounted in a vehicle, so as to obtain a control moment including at least one of a roll moment, a pitch moment, and a yaw moment that are generated for the vehicle before a curve on a traveling road
(Continued)

on which the vehicle runs, based on a physical quantity about a curvature ahead on the traveling road and a physical quantity about a speed of the vehicle. In this way, the passenger's sense of security when the vehicle runs on the curve may be improved.

20 Claims, 21 Drawing Sheets

(51) Int. Cl.
*B60W 10/22* (2006.01)
*B60W 30/045* (2012.01)
*B60G 17/0165* (2006.01)

(56) References Cited

U.S. PATENT DOCUMENTS

| | | | | |
|---|---|---|---|---|
| 7,934,733 | B2* | 5/2011 | Lundmark | B60G 21/0555 |
| | | | | 280/124.106 |
| 9,199,639 | B2* | 12/2015 | Yamakado | B60W 10/08 |
| 11,597,381 | B2* | 3/2023 | Kashiwamura | B60W 10/04 |
| 11,897,303 | B2* | 2/2024 | Yoshida | B60G 17/0182 |
| 2015/0032333 | A1 | 1/2015 | Nakatsu | |
| 2020/0254996 | A1 | 8/2020 | Kashiwamura | |
| 2021/0283969 | A1* | 9/2021 | Danielson | B60G 17/0165 |

FOREIGN PATENT DOCUMENTS

| | | |
|---|---|---|
| JP | 2015-23753 A | 2/2015 |
| JP | 2019-43196 A | 3/2019 |
| WO | WO 2013/125031 A1 | 8/2013 |

OTHER PUBLICATIONS

International Search Report (PCT/ISA/210) issued in PCT Application No. PCT/JP2022/022517 dated Aug. 16, 2022 with English translation (6 pages).

Japanese-language Written Opinion (PCT/ISA/237) issued in PCT Application No. PCT/JP2022/022517 dated Aug. 16, 2022 with English translation (9 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, to a vehicle control method, and to a vehicle control system.

BACKGROUND ART

Patent Document 1 discloses a vehicle behavior control apparatus that calculates a target longitudinal driving force for driving a vehicle, based on the driver's operation state and based on the motional state of the vehicle body during the running of the vehicle. This vehicle behavior control apparatus also calculates a plurality of target motion state quantities for controlling the behavior of the vehicle body. To achieve the target longitudinal driving force and the plurality of target motion state quantities, the vehicle behavior control apparatus calculates the driving force or braking force that a force generation mechanism generates for at least in one of the front wheels and rear wheels, and calculates the vertical force that vertical force generation means of a suspension mechanism applies to the vehicle body. The vehicle behavior control apparatus outputs a signal indicating the driving force or the braking force to the force generation mechanism, and outputs a signal indicating the vertical force toward the vertical force generation means.

REFERENCE DOCUMENT LIST

Patent Document

[Patent Document]
Patent Document 1: JP 2013-126821A

SUMMARY OF THE INVENTION

Problem to be Solved by the Invention

When a vehicle runs on a curve, the passengers may find the change in vehicle behavior uncomfortable. However, by controlling this behavior change by using, for example, the longitudinal force generated in the wheels, improvement in ride quality, etc., can be expected.

However, the longitudinal force, etc., are conventionally controlled after a behavior change occurs in the vehicle. That is, neither a preliminary operation in preparation for occurrence of a behavior change nor a behavior reduction operation is performed before a behavior change occurs. Thus, when the vehicle runs on a curve, the passenger's sense of security may decrease.

The present invention has been made in view of these actual circumstances, and it is an object of the present invention to provide a vehicle control apparatus, a vehicle control method, and a vehicle control system that can improve the passenger's sense of security when a vehicle runs on a curve.

Means for Solving the Problem

According to one mode of the present invention, a control command is output for operating an actuator unit mounted in a vehicle, so as to obtain a control moment including at least one of a roll moment, a pitch moment, and a yaw moment that are generated for the vehicle before a curve on a traveling road on which the vehicle runs, based on a physical quantity about a curvature ahead on the traveling road and a physical quantity about a speed of the vehicle.

Effects of the Invention

The present invention can improve the passenger's sense of security when a vehicle runs on a curve.

MODE FOR CARRYING OUT THE INVENTION

Hereinafter, an example of a vehicle control apparatus, a vehicle control method, and a vehicle control system according to the present invention will be described with reference to the accompanying drawings.

Figure 1:
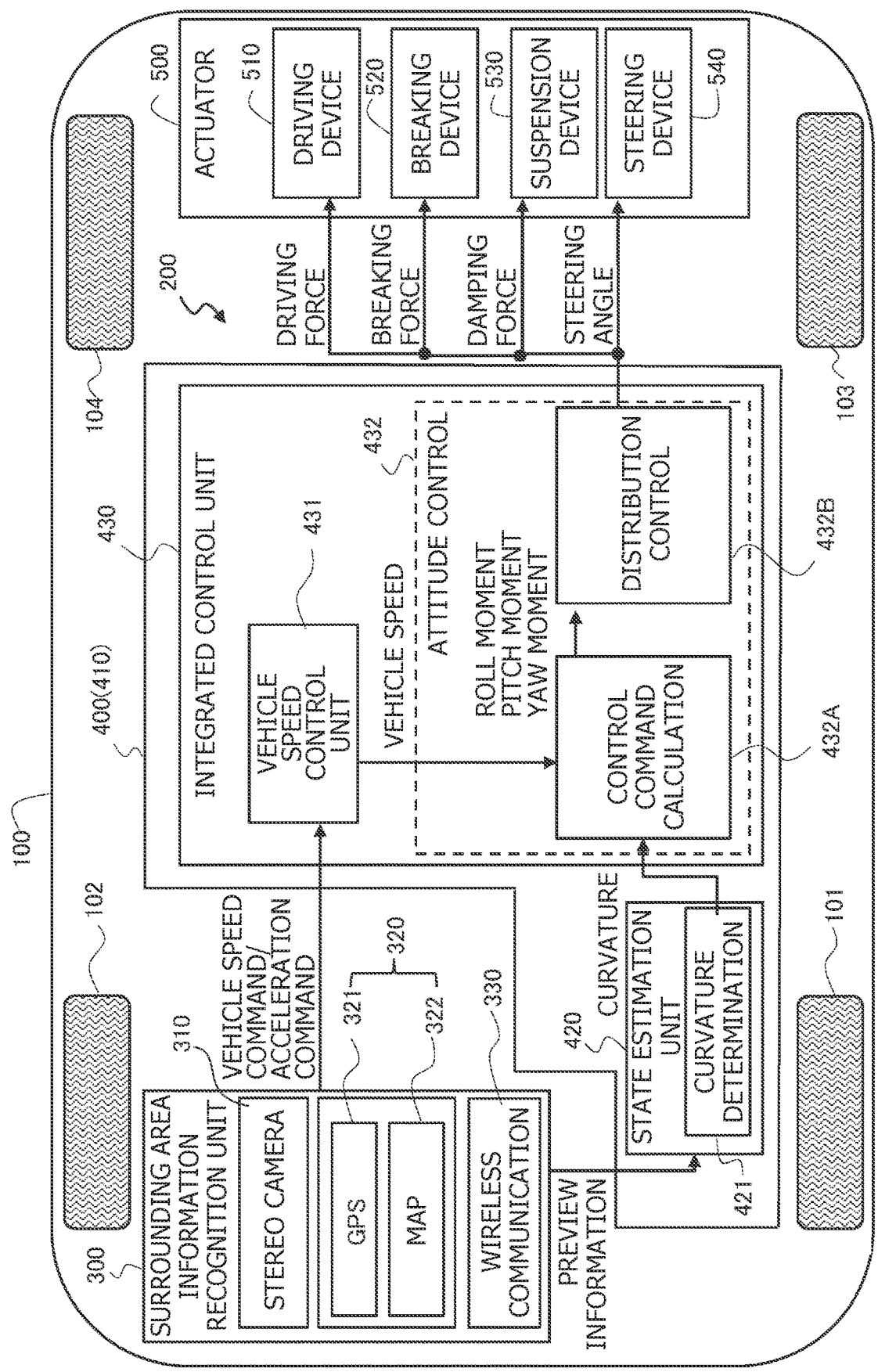
FIG. 1 is a block diagram illustrating a vehicle control system.

FIG. 1 is a block diagram illustrating a mode of a vehicle control system 200 mounted in a vehicle 100.

Vehicle control system 200 is a system for providing vehicle 100 with drive assistance such as for automated driving.

Vehicle 100 is a four-wheel automobile having a pair of right and left front wheels 101 and 102 and a pair of right and left rear wheels 103 and 104.

Vehicle control system 200 includes a surrounding area information recognition unit 300, a vehicle control apparatus 400, and an actuator unit 500.

Surrounding area information recognition unit 300 is an apparatus for acquiring and recognizing information about the surrounding area of vehicle 100. Surrounding area information recognition unit 300 outputs the acquired and recognized surrounding area information and also outputs a vehicle speed command, an acceleration command, etc., which have been calculated based on the surrounding area information and which are used in automated driving.

Surrounding area information recognition unit 300 includes a stereo camera 310, a navigation device 320, a wireless communication device 330, etc.

Stereo camera 310 captures an image of the surrounding area of vehicle 100, acquires image information about the surrounding area of vehicle 100, and measures the distance to a target object based on a triangulation method.

Navigation device 320 includes a GPS reception unit 321 and a map database 322.

GPS reception unit 321 measures the latitude and longitude of the location of vehicle 100 by receiving signals from GPS satellites.

Map database 322 is configured in a storage device mounted in vehicle 100.

The map information in map database 322 includes information about road locations, road shapes, intersection locations, etc.

Navigation device 320 refers to map database 322 based on the information about the location of vehicle 100 measured by GPS reception unit 321, determines the road on which vehicle 100 is running, and sets a route to the destination of vehicle 100.

Wireless communication device 330 is a device for performing a road-to-vehicle communication and/or a vehicle-to-vehicle communication.

The road-to-vehicle communication is a wireless communication between vehicle 100 and a roadside device installed on the traveling road, and the vehicle-to-vehicle communication is a wireless communication between vehicle 100 and another vehicle.

When performing the road-to-vehicle communication, wireless communication device 330 transmits information about vehicle 100 such as the speed and the traveling location of vehicle 100 to a roadside device, and receives road traffic information such as curves and intersections and information about other vehicles from the roadside device.

When performing the vehicle-to-vehicle communication, wireless communication device 330 transmits information about vehicle 100 to another vehicle, and receives information about another vehicle from this vehicle.

Vehicle control apparatus 400 is an electronic control apparatus (electronic control unit) including a microcomputer 410 as a control unit that outputs a result calculated based on input information.

Microcomputer 410 includes a microprocessor unit (MPU), a read-only memory (ROM), and a random access memory (RAM), etc., which are not illustrated in FIG. 1.

Microcomputer 410 acquires, from surrounding area information recognition unit 300, information about the current location of vehicle 100, preview information including, for example, information about the traveling road ahead of vehicle 100, and a vehicle speed command, an acceleration command, etc., based on the recognition of the surrounding area.

In addition, microcomputer 410 calculates a control command for operating actuator unit 500, based on the various kinds of information acquired, and outputs the calculated control commands to actuator unit 500.

Actuator unit 500 includes a driving device 510 that applies driving force to the drive wheels of vehicle 100, a braking device 520 that applies braking force to individual wheels 101 to 104 of vehicle 100, a suspension device 530 (suspension mechanism) that is able to adjust damping force applied to each of wheels 101 to 104, and a steering device 540 that changes the steering angle of front wheels 101 and 102, which are the steered wheels of vehicle 100.

Driving device 510 constitutes an in-wheel motor in each of wheels 101 to 104, for example.

Braking device 520 is a hydraulic braking device that includes, for example, a hydraulic energy source and that can individually adjust the braking force applied to each of wheels 101 to 104 by adjusting the hydraulic pressure applied to the brake cylinder of each of wheels 101 to 104.

Suspension device 530 includes, for example, an energy source based on hydraulic pressure, air pressure, or the like. Suspension device 530 constitutes a full-active suspension that can adjust the damping force and the vehicle height or constitutes a semi-active suspension that can adjust the damping force.

Steering device 540 is, for example, an electrically operated steering device including a motor that generates the steering force applied to front wheels 101 and 102.

Microcomputer 410 in vehicle control apparatus 400 has a function of controlling actuator unit 500. In other words, microcomputer 410 has an attitude control function as one of the drive assistance functions controlled by actuator unit 500. Specifically, based on the information about the road ahead of vehicle 100, microcomputer 410 changes the attitude of vehicle 100 before vehicle 100 enters a curve, so as to cause vehicle 100 to take a preliminary attitude in preparation for the curve.

When performing this attitude control, microcomputer 410 acquires a physical quantity about the curvature ahead of the traveling road on which vehicle 100 is running, and also acquires a physical quantity about the speed of vehicle 100.

Next, based on the physical quantity about the curvature ahead and the physical quantity about the speed, microcomputer 410 outputs a control command for operating actuator unit 500, so as to obtain a control moment including at least one of the roll moment, the pitch moment, and the yaw moment that vehicle 100 is controlled to generate before the curve.

That is, based on the curvature ahead and the speed of vehicle 100, microcomputer 410 calculates a control moment needed for vehicle 100 to take a predetermined preliminary attitude, and controls the driving force, the braking force, or the sprung displacement of suspension device 530 for each of wheels 101 to 104, so as to generate the control moment. Microcomputer 410 also controls the damping force or the steering force (steering angle).

Microcomputer 410 sets the control command for operating actuator unit 500 without changing the longitudinal or lateral acceleration generated in vehicle 100 while obtaining the control moment.

Since this attitude control of microcomputer 410 allows vehicle 100 to take a preliminary attitude before a curve, the passengers of vehicle 100 can recognize running on the curve in advance based on the change in attitude of vehicle 100, and can have a sense of security.

In addition, by causing vehicle 100 to generate a roll angle or a yaw angle before vehicle 100 enters a curve, the roll angle, the roll rate, or the yaw rate generated when vehicle 100 runs on the curve is reduced, and passenger comfort and driving operability are improved.

Hereinafter, the attitude control performed before a curve by microcomputer 410 in vehicle control apparatus 400 will be described in more detail.

Microcomputer 410 includes a state estimation unit 420 and an integrated control unit 430 as its main functional units.

State estimation unit 420 is a functional unit that determines the traveling state or the traveling environment of vehicle 100, and includes a curvature determination unit 421.

Curvature determination unit 421 obtains information about the curvature of the traveling road at the preview point ahead of vehicle 100 based on the preview information acquired from surrounding area information recognition unit 300, and outputs the obtained information about the curvature.

Integrated control unit 430 is a functional unit that integrally controls running of vehicle 100, and includes a vehicle speed control unit 431 and an attitude control unit 432.

Vehicle speed control unit 431 controls actuator unit 500 based on the vehicle speed command and the acceleration command acquired from surrounding area information recognition unit 300, controls the speed and acceleration of vehicle 100, and outputs information about the vehicle speed to attitude control unit 432.

Attitude control unit 432 can acquire information about the vehicle speed from a vehicle speed sensor or a wheel speed sensor.

Attitude control unit 432 is a functional unit that changes, before vehicle 100 enters a curve, the attitude of vehicle 100 to a preliminary attitude in preparation for running on the curve, and includes a control command calculation unit 432A and a distribution control unit 432B.

Control command calculation unit 432A acquires the information about the vehicle speed from vehicle speed control unit 431, and acquires the information about the curvature of the traveling road at the preview point ahead of vehicle 100 from curvature determination unit 421.

Next, control command calculation unit 432A calculates a control moment (in other words, a moment command value) including at least one of the roll moment, the pitch moment, and the yaw moment that vehicle 100 is controlled to generate before the curve, based on the acquired information about the vehicle speed and the acquired information about the curvature of the traveling road.

Distribution control unit 432B acquires information about the control moment from control command calculation unit 432A, and outputs a control command for operating actuator unit 500, so as to generate the control moment.

That is, distribution control unit 432B outputs a driving force command to driving device 510, a braking force command to braking device 520, a damping force command to suspension device 530, and a steering angle command to steering device 540, so as to generate the control moment.

Figure 2:
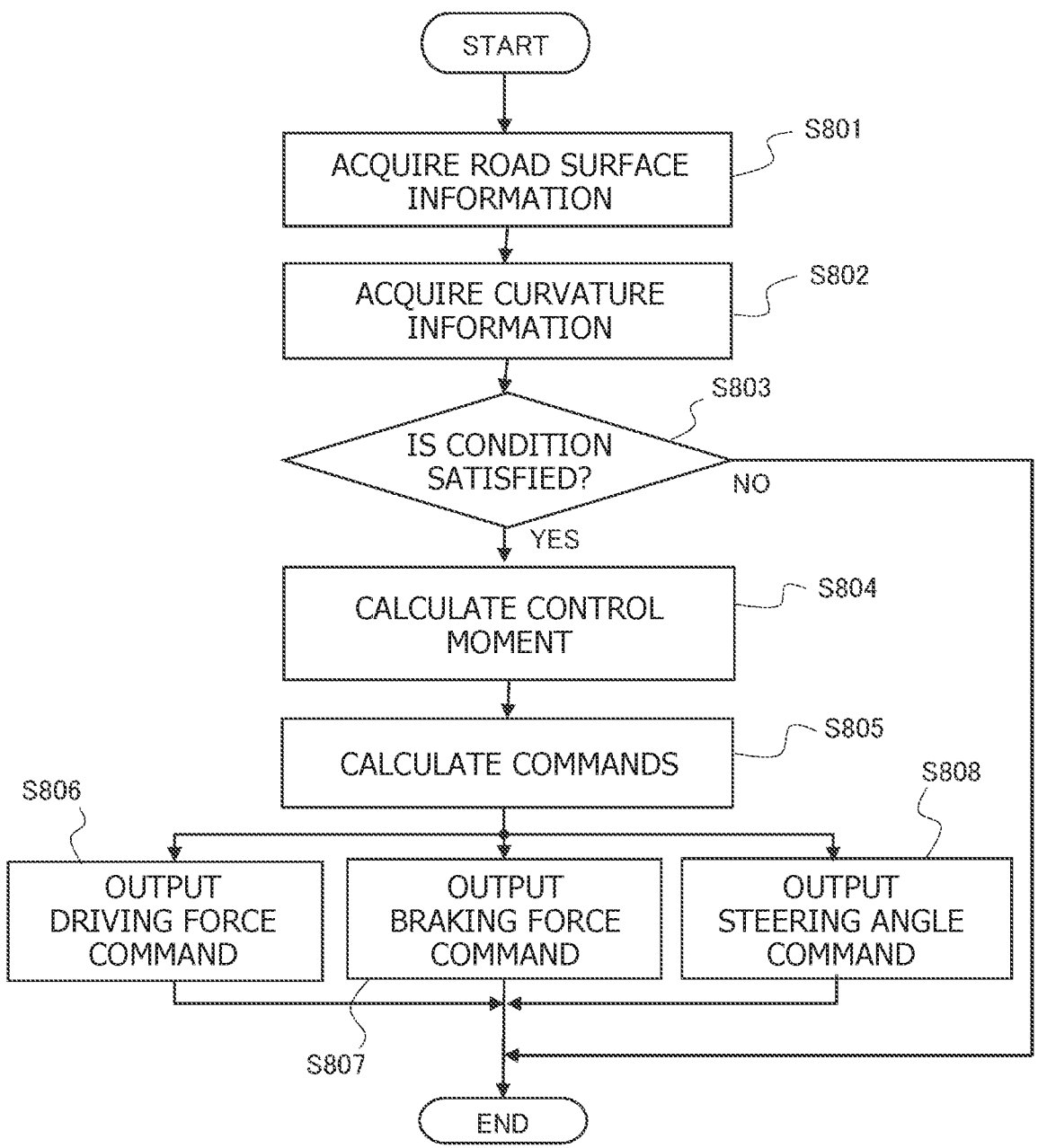
FIG. 2 is a flowchart illustrating a procedure of attitude control.

FIG. 2 is a flowchart illustrating a procedure of the attitude control performed by microcomputer 410.

Microcomputer 410 periodically performs the routine illustrated in FIG. 2, for example, in a temporally interrupted manner.

First, in step S801, microcomputer 410 acquires information about the road surface at the preview point ahead of vehicle 100 from surrounding area information recognition unit 300.

Next, in step S802, microcomputer 410 calculates the curvature of the traveling road at the preview point based on the road surface information acquired in step S801.

Hereinafter, the preview point, the curvature at the preview point, etc., used in the attitude control performed by microcomputer 410 will be described with reference to FIG. 3.

In the present application, the distance [m] from the current location of vehicle 100 to the preview point on the traveling road ahead of vehicle 100 will be referred to as "distance L", and the time [in seconds] needed for vehicle 100 to reach the preview point from the current location at a current vehicle speed V [km/h] will be referred to as "time t".

Assuming that the turning radius of the traveling road at the preview point is R[m] and that the curvature of the traveling road at the preview point is Kp, the curvature Kp is calculated by Kp=1/R.

In addition, the present application assumes that the curvature of the traveling road at the current location of vehicle 100 is Kv.

In addition, the force that rotates the vehicle body about the X axis going through the center of mass of vehicle 100 in the longitudinal direction will be referred to as "roll moment". The force that rotates the vehicle body about the Y axis going through the center of mass of vehicle 100 in the lateral direction will be referred to as "pitch moment". The force that rotates the vehicle body about the Z axis going through the center of mass of vehicle 100 in the vertical direction will be referred to as "yaw moment".

Figure 4:
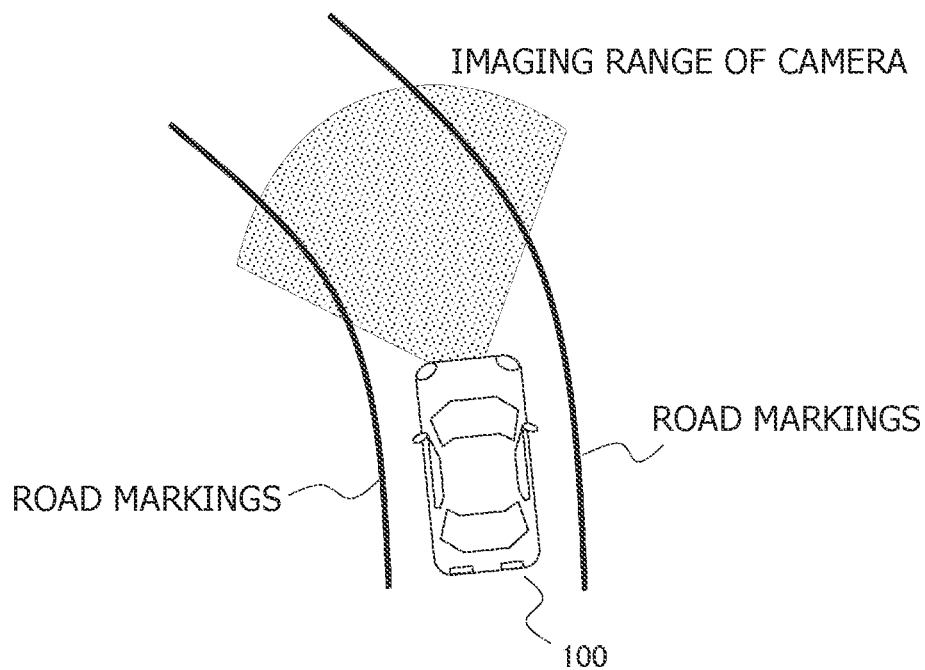
FIG. 4 illustrates a method for acquiring curvature information from a stereo camera.
Figure 5:
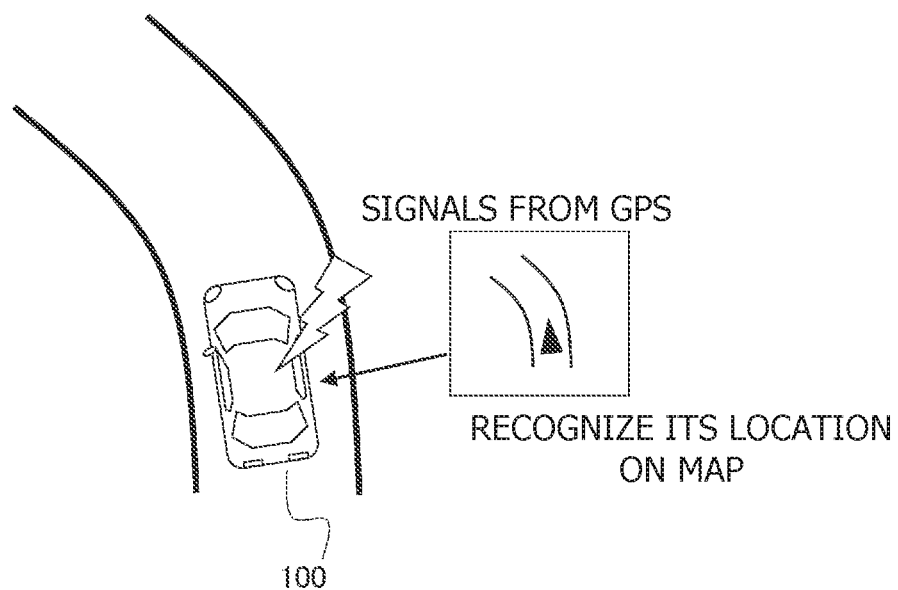
FIG. 5 illustrates a method for acquiring curvature information based on the location of a vehicle and map information.
Figure 6:
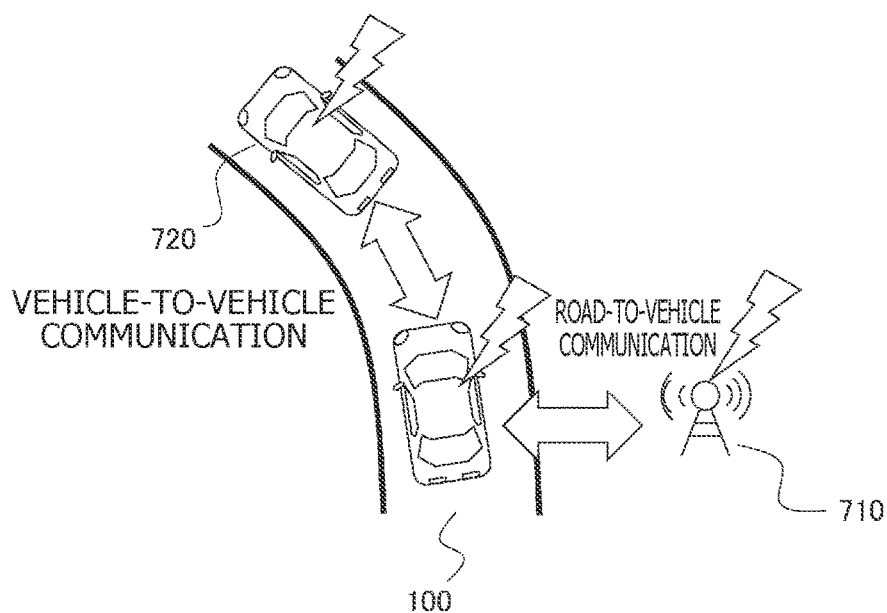
FIG. 6 illustrates a method for acquiring curvature information through a road-to-vehicle communication or a vehicle-to-vehicle communication.

FIGS. 4 to 6 illustrate example methods that microcomputer 410 (curvature determination unit 421) uses to acquire information about curvature Kp at a preview point.

FIG. 4 illustrates a method in which determination unit 421 acquires information about curvature Kp based on information about road markings recognized from an image captured by stereo camera 310.

FIG. 5 illustrates a method in which curvature determination unit 421 acquires information about curvature Kp by recognizing the location of vehicle 100 on a map based on the result of the measurement of the location of vehicle 100 obtained by navigation device 320 and based on the map information and by searching the information about the curvatures of the roads included in the map information.

FIG. 6 illustrates a method in which curvature determination unit 421 acquires information about curvature Kp from a roadside device 710 or another vehicle 720 through a road-to-vehicle communication or a vehicle-to-vehicle communication performed by wireless communication device 330.

After acquiring the information about curvature Kp at the preview point in step S802, microcomputer 410 determines whether an attitude control start condition is satisfied in step S803.

In step S803, microcomputer 410 determines whether at least one of the following first start condition and second start condition is satisfied.

First start condition: curvature Kp at the preview point is equal to or greater than a first threshold Kp1 (Kp≥Kp1)

Second start condition: deviation between curvature Kp at the preview point and curvature Kv at the current location is equal to or greater than a second threshold Kp2 (Kp−Kv≥Kp2)

First threshold Kp1 is a value satisfying Kp1>0, and second threshold Kp2 is a value satisfying Kp2>0.

If at least one of the first start condition and the second start condition is satisfied, microcomputer 410 determines whether any one of the following third start condition to sixth start condition is satisfied.

Third start condition: distance L from the current location to the preview point is equal to or less than a third threshold L3 (L≤L3).

Fourth start condition: time t needed for vehicle 100 to reach the preview point is equal to or less than a fourth threshold t4 (t≤t4).

Fifth start condition: the steering angle is within a predetermined angle, and it is estimated that the steering has not started yet.

Sixth start condition: the actual yaw rate is within a predetermined range, and it is estimated that the steering has not started yet.

If at least one of the first start condition and the second start condition is satisfied, and if at least one of the third start condition to the sixth start condition is satisfied, microcomputer 410 determines that the attitude control start condition is satisfied.

In other words, microcomputer 410 performs the attitude control if there is a curve on the traveling road ahead of vehicle 100 and if vehicle 100 is running approximately straight in a predetermined range before the curve.

On the other hand, if the attitude control start condition is not satisfied, microcomputer 410 ends the present process, that is, does not perform the attitude control.

If the attitude control start condition is satisfied, the process proceeds to step S804, and microcomputer 410 performs the attitude control.

Figure 3:
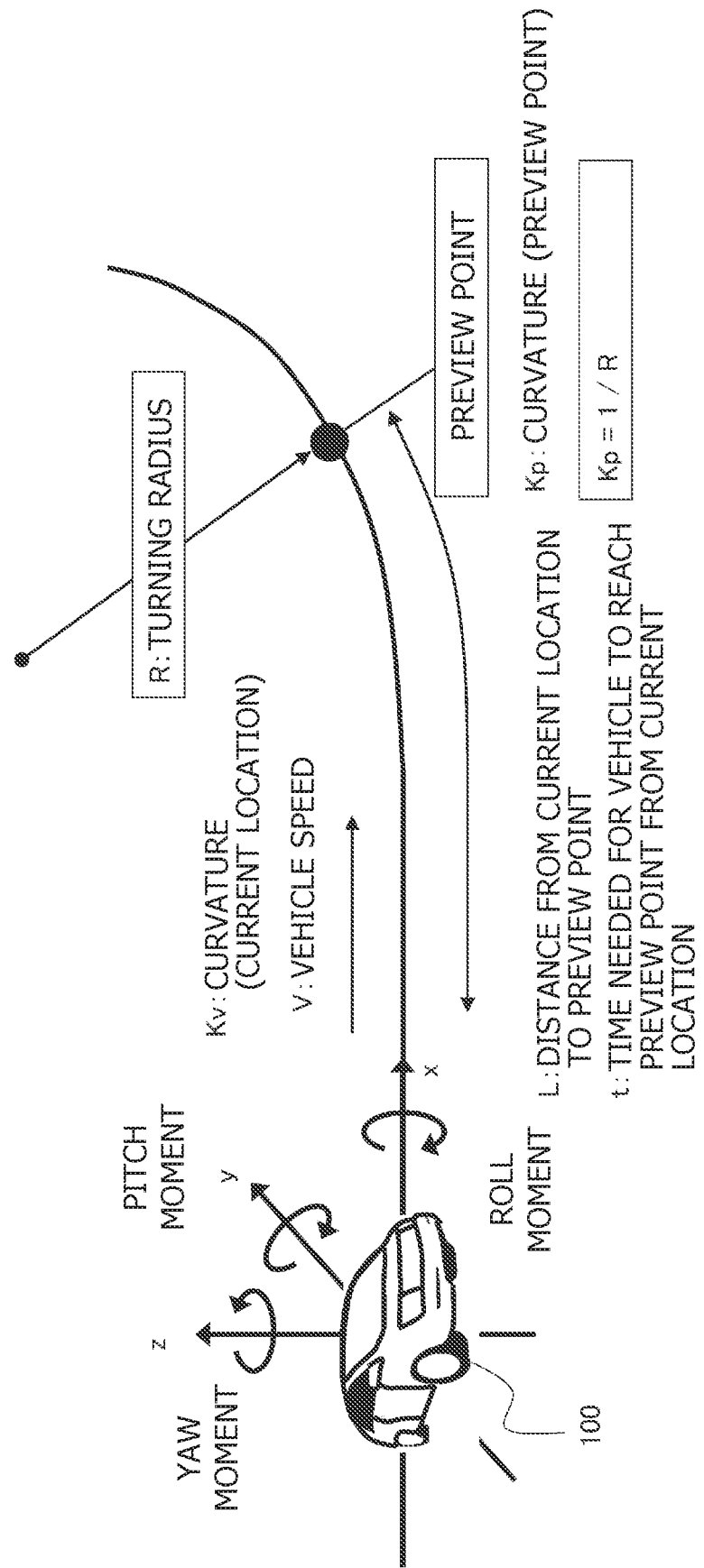
FIG. 3 illustrates a preview point, a curvature, etc., in the attitude control.

In step S804, based on curvature Kp at the preview point and current vehicle speed V, microcomputer 410 calculates the three-axis target moments of vehicle 100 for the attitude control, specifically, calculates at least one of a target roll moment Mx, a target pitch moment My, and a target yaw moment Mz (see FIG. 3).

Microcomputer 410 calculates at least one of target roll moment Mx, target pitch moment My, and target yaw moment Mz as follows, based on the difference between curvature Kp at the preview point and curvature Kv at the current location and vehicle speed V.

Target roll moment $Mx = Cx \cdot V \cdot (Kp - Kv)$

Target pitch moment $My = Cy \cdot V \cdot (Kp - Kv)$

Target yaw moment $Mz = Cz \cdot V \cdot (Kp - Kv)$

In the above equations, Cx, Cy, and Cz represent the control gains of target moments Mx, My, and Mz, respectively.

Control gains Cx, Cy, and Cz are adjusted based on experiments, simulations, etc., in the design and development phases of vehicle control system 200, and are stored as control constants in a memory of microcomputer 410.

As illustrated in the above equations, microcomputer 410 calculates a control moment including at least one of target roll moment Mx, target pitch moment My, and target yaw moment Mz by multiplying the difference between curvature Kp at the preview point and curvature Kv at the current location and the vehicle speed by their respective control gains.

Thus, if the difference between curvature Kp at the preview point and curvature Kv at the current location is greater, the control moment represents a greater value. In addition, if the vehicle speed V is greater, the control moment also represents a greater value.

In designing the shape of a road, if a transition curve, which is a curve that gradually changes from a straight line to have a curvature of a predetermined arc, is inserted, the difference between curvature Kp at the preview point and curvature Kv at the current location gradually increases as vehicle 100 becomes closer to the curve, and the control moment gradually increases accordingly.

Thus, for example, when microcomputer 410 calculates roll moment Mx to cause vehicle 100 to take a roll attitude as a preliminary attitude, roll moment Mx increases as vehicle 100 becomes closer to the curve, and accordingly, the roll angle of vehicle 100 gradually increases, based on curvature Kp and vehicle speed V.

In addition, by using Equation 1 based on curvature Kp at the preview point and current vehicle speed V, microcomputer 410 can calculate the lateral acceleration (estimated lateral acceleration) of vehicle 100, which is predicted to occur at the preview point, and can calculate target moments Mx, My, and Mz, based on this lateral acceleration and control gains Cx1, Cy1, and Cz1 of target moments Mx, My, and Mz.

Lateral Acceleration $Gy = Kp * V^2$ [Equation 1]

In addition, by using Equation 2 based on curvature Kp at the preview point and current vehicle speed V, microcomputer 410 can calculate the lateral jerk (estimated lateral jerk) of vehicle 100, which is predicted to occur at the preview point, and can calculate target moments Mx, My, and Mz based on this lateral jerk and control gains Cx2, Cy2, and Cz2 of target moments Mx, My, and Mz.

In Equation 2, each of the dots, which are above reference characters G and K, denotes a differential value.

Lateral Jerk $\dot{G}y = \dot{K}p * V^2$ [Equation 2]

In addition, microcomputer 410 can calculate the three-axis moments (estimated moments) of vehicle 100, which are predicted to occur at the preview point, based on curvature Kp at the preview point and current vehicle speed V, and can calculate target moments Mx, My, and Mz matching the magnitudes of the estimated moments calculated.

After calculating the control moment in step S804, microcomputer 410 calculates control commands supplied to actuator unit 500 for obtaining the control moment in step S805. That is, microcomputer 410 calculates a driving force command, a braking force command, a steering angle command, etc.

Next, microcomputer 410 outputs the driving force command (driving command) calculated in step S805 to driving device 510 in step S806, outputs the braking force command (braking command) calculated in step S805 to braking device 520 in step S807, and outputs the steering angle command calculated in step S805 to steering device 540 in step S808.

Hereinafter, the control of actuator unit 500 for obtaining the control moment representing at least one of target roll moment Mx, target pitch moment My, and target yaw moment Mz will be described in detail.

Figure 7:
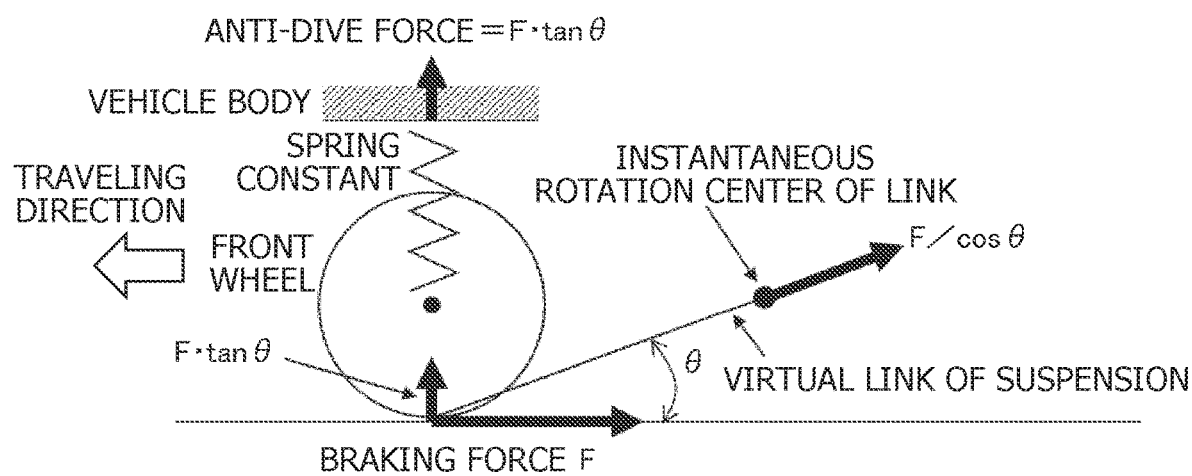
FIG. 7 illustrates how applying braking force results in applying anti-dive force to the front wheels.

FIG. 7 illustrates how applying braking force F (in other words, the driving force in the direction opposite to the traveling direction of vehicle 100 or the longitudinal force in the direction opposite to the traveling direction of vehicle 100) to the front wheels causes anti-dive force on the front wheels.

The left side in FIG. 7 corresponds to the front side of vehicle 100, and the instantaneous rotation center of the front wheels is located on the rear side of the vehicle behind the front wheels.

Herein, assuming that the angle formed by a line connecting the instantaneous rotation center of a front wheel and a point connecting the front wheel and the ground and a horizontal line is θ, compression force F/cos θ is applied to the virtual link by braking force F (in other words, the driving force in the direction opposite to the traveling direction of vehicle 100).

Anti-dive force Fad (Fad=F·tan θ) is applied to the front wheel, to which braking force F is applied, in the direction of raising the vehicle body, as a component force of compression force F/cos θ.

On the other hand, if the driving force (in other words, the driving force in the traveling direction of vehicle 100 or the longitudinal force in the traveling direction of vehicle 100) is applied to a front wheel, tension is applied to the virtual link, anti-squat force Fas is applied in the direction of pressing down the vehicle body, as a component force of the tension.

In addition, in the case of the rear wheels, because the instantaneous rotation center is located in front of the rear wheels, anti-squat force Fas and anti-dive force Fad are applied in the directions opposite to those in the case of the front wheels. That is, anti-squat force Fas is applied to the vehicle body when braking force is applied, and anti-dive force Fad is applied to the vehicle body when driving force is applied.

Thus, microcomputer 410 in vehicle control apparatus 400 can selectively apply anti-dive force Fad or anti-squat force Fas for each of wheels 101 to 104, based on which one of the braking force and driving force is applied to wheels 101 to 104.

Vehicle control apparatus 400 can cause vehicle 100 to take a preliminary attitude, by giving a moment to the vehicle body, the moment being based on a control moment obtained through longitudinal force control for each wheel.

Hereinafter, the attitude control method, more specifically, a method for giving a control moment to a vehicle body through control of longitudinal force (braking and driving force), will be described in more detail.

Figure 8:
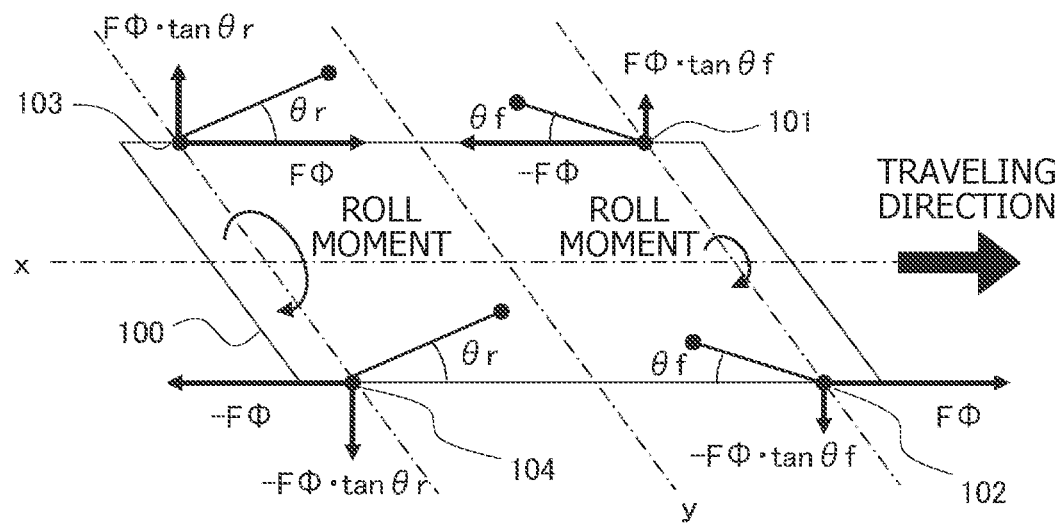
FIG. 8 illustrates a method for giving a roll moment to the vehicle through control of longitudinal force.
Figure 9:
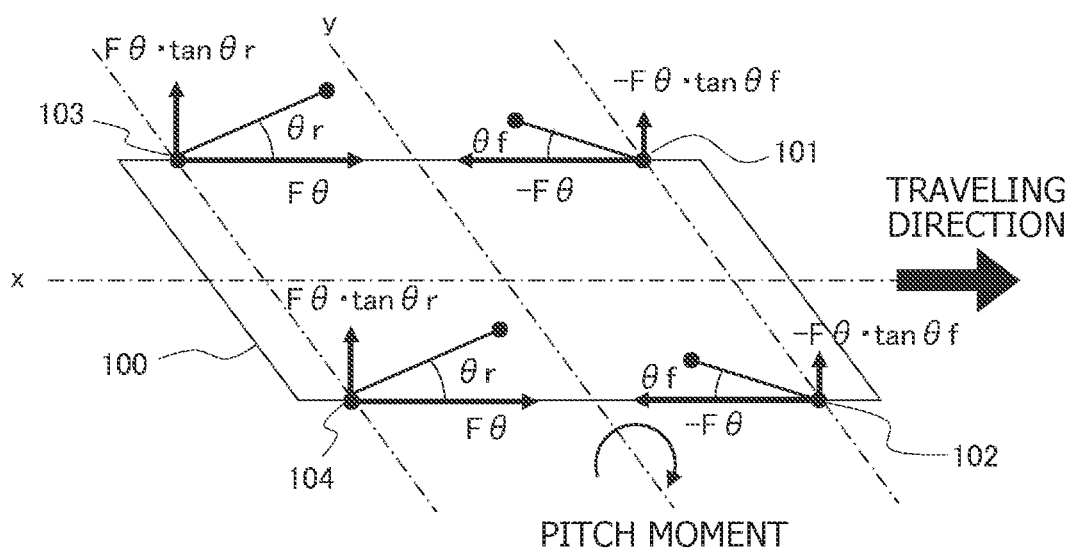
FIG. 9 illustrates a method for giving a pitch moment to the vehicle through control of longitudinal force.

FIGS. 8 and 9 illustrate attitude control performed by vehicle 100 in which driving device 510 constitutes an in-wheel motor installed in each of wheels 101 to 104 and can independently adjust the driving force for each of wheels 101 to 104, and in which braking device 520 can independently adjust the braking force for each of wheels 101 to 104.

FIG. 8 illustrates a method for causing vehicle 100 to take a preliminary attitude (roll attitude) by giving a roll moment to vehicle 100 through control of the longitudinal force applied to each of wheels 101 to 104.

FIG. 8 assumes that the angle of the virtual link of front wheels 101 and 102 is θf and the angle of the virtual link of rear wheels 103 and 104 is θr.

In the case in FIG. 8, microcomputer 410 applies braking force −FΦ to left front wheel 101, applies driving force FΦ to right front wheel 102, applies driving force FΦ to left rear wheel 103, and applies braking force −FΦ to right rear wheel 104.

If the roll direction is set to be opposite to that in FIG. 8, microcomputer 410 applies driving force FΦ to left front wheel 101, applies braking force −FΦ to right front wheel 102, applies braking force −FΦ to left rear wheel 103, and applies driving force FΦ to right rear wheel 104.

That is, when microcomputer 410 causes vehicle 100 to take a roll attitude, microcomputer 410 applies first driving force in the traveling direction of vehicle 100 to a first wheel, which is one of front wheels 101 and 102 of vehicle 100, and applies second driving force in the direction opposite to the traveling direction of vehicle 100 to a second wheel, which is the other one of front wheels 101 and 102.

In addition, microcomputer 410 applies third driving force matching the first driving force in the direction opposite to the traveling direction of vehicle 100 to a third wheel, which is one of rear wheels 103 and 104 of vehicle 100 and which is on the same side as the first wheel, and applies fourth driving force matching the second driving force in the traveling direction of vehicle 100 to a fourth wheel, which is the other one of rear wheels 103 and 104 of vehicle 100 and which is on the same side as the second wheel.

In the driving and braking state illustrated in FIG. 8, anti-dive force Fad (Fad=FΦ·tan θf) is applied to left front wheel 101, anti-squat force Fas (Fas=−FΦ·tan θf) is applied to right front wheel 102, anti-dive force Fad (Fad=FΦ·tan θr) is applied to left rear wheel 103, and anti-squat force Fas (Fas=−FΦ·tan θr) is applied to right rear wheel 104.

That is, anti-dive Fad is applied to front wheel 101 and rear wheel 103 on the left side of vehicle 100, and anti-squat force Fas is applied to front wheel 102 and rear wheel 104 on the right side of vehicle 100.

Thus, if microcomputer 410 applies the longitudinal force (braking and driving force) to wheels 101 to 104 as illustrated in FIG. 8, a roll moment, which is the force that rotates the vehicle body about the X axis going through the center of mass of vehicle 100 in the longitudinal direction, is generated. As a result, the attitude of vehicle 100 is set in a tilted state (in other words, a roll state) in which the left side of vehicle 100 is higher than the right side of vehicle 100.

That is, microcomputer 410 can cause vehicle 100 to take a roll attitude before vehicle 100 enters a curve by controlling the longitudinal force for each of wheels 101 to 104, and can set the roll angle to the angle that matches the curvature of the traveling road and the vehicle speed by setting driving force FΦ and braking force −FΦ based on target roll moment Mx.

In addition, the longitudinal force that microcomputer 410 applies to left front wheel 101 and the longitudinal force that microcomputer 410 applies to the left rear wheel 103 have the same absolute value but have opposite directions. Similarly, the longitudinal force that microcomputer 410 applies to right front wheel 102 and the longitudinal force that microcomputer 410 applies to right rear wheel 104 have the same absolute value but have opposite directions.

Thus, regarding the longitudinal force that the attitude control of microcomputer 410 applies to wheels 101 to 104, the longitudinal force applied to left front wheel 101 matches the longitudinal force applied to left rear wheel 103, and the longitudinal force applied to right front wheel 102 matches the longitudinal force applied to right rear wheel 104.

Thus, as illustrated in FIG. 8, with the attitude control that independently applies longitudinally balanced longitudinal force to the individual wheels, a roll moment can be given without causing longitudinal or lateral acceleration in vehicle 100.

FIG. 9 illustrates a method for causing vehicle 100 to take a preliminary attitude (pitch attitude) by giving a pitch moment to vehicle 100 through control of the longitudinal force for each of wheels 101 to 104.

In the case in FIG. 9, microcomputer 410 applies braking force $-F\theta$ to left front wheel 101, applies braking force $-F\theta$ to right front wheel 102, applies driving force $F\theta$ to left rear wheel 103, and applies driving force $F\theta$ to right rear wheel 104.

That is, when microcomputer 410 causes vehicle 100 to take a pitch attitude, microcomputer 410 applies first driving force in the direction opposite to the traveling direction of vehicle 100 to a first wheel, which is one of front wheels 101 and 102 of vehicle 100, and applies second driving force in the direction opposite to the traveling direction of vehicle 100 to a second wheel, which is the other one of front wheels 101 and 102.

In addition, microcomputer 410 applies third driving force matching the first driving force in the traveling direction of vehicle 100 to a third wheel, which is one of rear wheels 103 and 104 of vehicle 100 and which is on the same side as the first wheel, and applies fourth driving force matching the second driving force in the traveling direction of vehicle 100 to a fourth wheel, which is the other one of rear wheels 103 and 104 of vehicle 100 and which is on the same side as the second wheel.

In the driving and braking state illustrated in FIG. 9, anti-dive force Fad (Fad=$F\theta \cdot \tan \theta f$) is applied to left front wheel 101 and right front wheel 102, and anti-dive force Fad (Fad=$F\theta \cdot \tan \theta r$) is applied to left rear wheel 103 and right rear wheel 104.

The difference between virtual link angle $\theta f$ of the front wheels and virtual link angle $\theta r$ of the rear wheels causes the difference between anti-dive force Fad applied to left front wheel 101 and right front wheel 102 and anti-dive force Fad applied to left rear wheel 103 and right rear wheel 104. As a result, a pitch moment, which is the force that rotates the vehicle body about the Y axis going through the center of mass of vehicle 100 in the lateral direction, is generated.

In the case in FIG. 9, because $\theta f < \theta r$, anti-dive force Fad applied to left front wheel 101 and right front wheel 102 is less than anti-dive force Fad applied to left rear wheel 103 and right rear wheel 104.

Thus, by applying the longitudinal force to each of wheels 101 to 104 as illustrated in FIG. 9, microcomputer 410 can give a pitch moment that lowers the front side of vehicle 100 (nosedive state).

That is, microcomputer 410 can cause vehicle 100 to take a pitch attitude before vehicle 100 enters a curve by controlling the longitudinal force for each of wheels 101 to 104, and can set the pitch angle to the angle that matches the curvature of the traveling road and the vehicle speed by setting driving force $F\Phi$ and braking force $-F\Phi$ based on target pitch moment Mx.

In addition, in accordance with the attitude control method illustrated in FIG. 9, braking force $-F\theta$ that microcomputer 410 applies to left front wheel 101 and driving force $F\theta$ that microcomputer 410 applies to left rear wheel 103 have the same absolute value but have opposite directions. Similarly, braking force $-F\theta$ that microcomputer 410 applies to right front wheel 102 and driving force $F\theta$ that microcomputer 410 applies to right rear wheel 104 have the same absolute value but have opposite directions.

Thus, regarding the longitudinal force that the attitude control of microcomputer 410 applies, the longitudinal force applied to left front wheel 101 matches the longitudinal force applied to left rear wheel 103, and the longitudinal force applied to right front wheel 102 matches the longitudinal force applied to right rear wheel 104.

Thus, as illustrated in FIG. 9, with the attitude control that independently applies longitudinally balanced force to the individual wheels, a pitch moment can be given without causing longitudinal or lateral acceleration in vehicle 100.

Microcomputer 410 can link the roll moment control and the pitch moment control with each other. In other words, microcomputer 410 can synchronize the roll moment control and the pitch moment control with each other.

For example, when linking the roll moment control illustrated in FIG. 8 and the pitch moment control illustrated in FIG. 9 with each other, microcomputer 410 sets longitudinal force $F_{FL}$ applied to left front wheel 101, longitudinal force $F_{FR}$ applied to right front wheel 102, longitudinal force $F_{RL}$ applied to left rear wheel 103, and longitudinal force $F_{RR}$ applied to right rear wheel 104 as follows.

$$F_{FL} = -F\Phi - F\theta$$

$$F_{FR} = F\Phi - F\theta$$

$$F_{RL} = F\Phi + F\theta$$

$$F_{RR} = -F\Phi + F\theta$$

That is, when linking the roll moment control and the pitch moment control with each other, per wheel, microcomputer 410 sets a sum of the longitudinal force for obtaining target roll moment Mx and the longitudinal force for obtaining target pitch moment My as the longitudinal force applied for giving the attitude control.

Next, a case in which vehicle 100 is an FF (front engine, front drive) vehicle of which front wheels 101 and 102 are the drive wheels or is an FR (front engine, rear drive) vehicle of which rear wheels 103 and 104 are the drive wheels will be described. That is, the attitude control on vehicle 100 that cannot independently apply driving force to each of the four wheels will be described.

Figure 10:
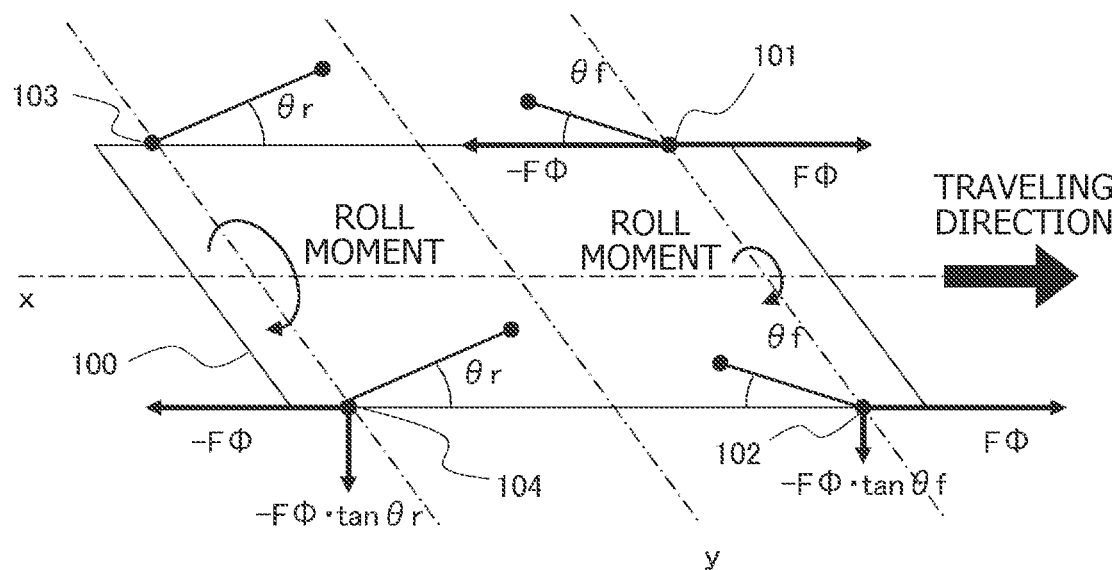
FIG. 10 illustrates a method for giving a roll moment to an FF vehicle.

FIG. 10 illustrates a method for causing vehicle 100 to take a preliminary attitude (roll attitude) by giving a roll moment to vehicle 100 through control of the longitudinal force when vehicle 100 is an FF vehicle of which left front wheel 101 and right front wheel 102 are connected to each other by a drive shaft.

In this case, microcomputer 410 applies driving force FΦ to left front wheel 101 and right front wheel 102, which are the drive wheels, and applies braking force −FΦ to left front wheel 101 and right rear wheel 104.

That is, when causing this FF vehicle to take a roll attitude, microcomputer 410 applies first driving force in the traveling direction of vehicle 100 to a first wheel, which is one of front wheels 101 and 102 of vehicle 100, and to a second wheel, which is the other one of front wheels 101 and 102 and which is connected to the first wheel by a drive shaft.

In addition, microcomputer 410 applies first braking force matching the first driving force in the direction opposite to the traveling direction of vehicle 100 to a third wheel, which is one of rear wheels 103 and 104 of vehicle 100 and which is on the same side as the first wheel, and applies second braking force matching the first driving force in the direction opposite to the traveling direction of vehicle 100 to the second wheel.

In this case, anti-squat force Fas (Fas=−FΦ·tan θf) is applied to right front wheel 102 by driving force FΦ.

However, because driving force FΦ and braking force −FΦ are simultaneously applied to left front wheel 101, driving force FΦ and braking force −FΦ balance out, and as a result, no anti-squat force Fas is applied.

In other words, microcomputer 410 applies driving force FΦ to right front wheel 102 in order to generate anti-squat force Fas, and applies driving force FΦ to left front wheel 101. However, microcomputer 410 also applies braking force −FΦ matching driving force FΦ to left front wheel 101, so as to prevent anti-squat force Fas from being applied to left front wheel 101 by driving force FΦ applied to left front wheel 101.

In addition, anti-squat force Fas (Fas=−FΦ·tan θr) is applied to right rear wheel 104 by braking force −FΦ.

However, because neither braking force −FΦ nor driving force FΦ is applied to left rear wheel 103, neither anti-dive force Fad nor anti-squat force Fas is applied to left rear wheel 103.

That is, in the driving and braking state illustrated in FIG. 10, while neither anti-dive force Fad nor anti-squat force Fas is applied to left front wheel 101 and left rear wheel 103, anti-squat force Fas (Fas=−FΦ·tan θf) is applied to right front wheel 102, and anti-squat force Fas (Fas=−FΦ·tan θr) is applied to right rear wheel 104.

Thus, when vehicle 100 is an FF vehicle, microcomputer 410 gives a roll moment to vehicle 100 by applying the longitudinal force to each of wheels 101 to 104 as illustrated in FIG. 10. As a result, microcomputer 410 can cause vehicle 100 to take a roll attitude in which the left side of vehicle 100 is higher than the right side of vehicle 100.

In addition, since microcomputer 410 applies driving force FΦ and braking force −FΦ to left front wheel 101, applies driving force FΦ to right front wheel 102, and applies braking force −FΦ to right rear wheel 104, driving force FΦ and braking force −FΦ balance out on each of the right and left sides of vehicle 100.

Thus, microcomputer 410 can cause vehicle 100, which is an FF vehicle in this case, to take a roll attitude without causing longitudinal or lateral acceleration in vehicle 100.

When causing vehicle 100 to take a roll attitude in the direction opposite to that illustrated in FIG. 10, microcomputer 410 applies driving force FΦ to left front wheel 101 and right front wheel 102, which are the drive wheels, and applies braking force −FΦ to right front wheel 102 and left rear wheel 103.

That is, when causing an FF vehicle to take a roll attitude, microcomputer 410 applies first longitudinal force (driving force FΦ) in the traveling direction of vehicle 100 to a first wheel, which is one of the pair of front wheels 101 and 102 of vehicle 100, and to a second wheel, which is the other one of the pair of front wheels 101 and 102 and which is connected to the first wheel by a drive shaft.

In addition, microcomputer 410 applies second longitudinal force (braking force −FΦ) matching the first longitudinal force (driving force FΦ) in the direction opposite to the traveling direction of vehicle 100 to a third wheel, which is one of the pair of rear wheels 103 and 014 of vehicle 100 and which is on the same side as the first wheel, and the second wheel.

Figure 11:
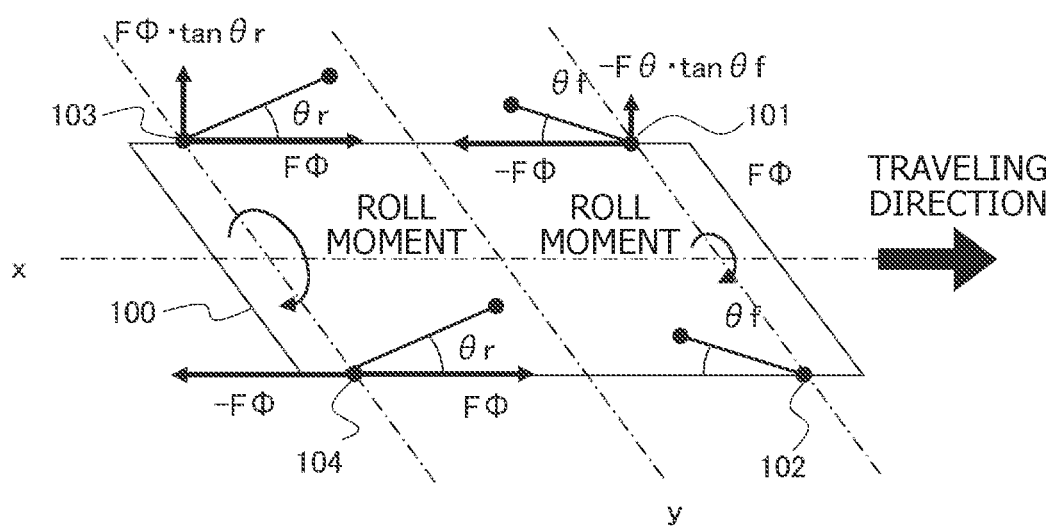
FIG. 11 illustrates a method for giving a roll moment to an FR vehicle.

FIG. 11 illustrates a method for causing vehicle 100 to take a preliminary attitude (roll attitude) by giving a roll moment to vehicle 100 through control of the longitudinal force when vehicle 100 is an FR vehicle of which left rear wheel 103 and right rear wheel 104 are connected to each other by a drive shaft.

In this case, microcomputer 410 applies driving force FΦ to left rear wheel 103 and right rear wheel 104, which are the drive wheels, and applies braking force −FΦ to left front wheel 101 and right rear wheel 104.

That is, when causing an FR vehicle to a roll attitude, microcomputer 410 applies first driving force in the traveling direction of vehicle 100 to a first wheel, which is one of rear wheels 103 and 104 of vehicle 100, and to a second wheel, which is the other one of rear wheels 103 and 104 and which is connected to the first wheel by a drive shaft.

In addition, microcomputer 410 applies first braking force matching the first driving force in the direction opposite to the traveling direction of vehicle 100 to a third wheel, which is one of front wheels 101 and 102 of vehicle 100 and which is on the same side as the first wheel, and applies second braking force matching the first driving force in the direction opposite to the traveling direction of vehicle 100 to the second wheel.

In this case, anti-squat force Fad (Fad=FΦ·tan θr) is applied to left rear wheel 103 by driving force FΦ.

However, because microcomputer 410 applies driving force FΦ and braking force −FΦ to right rear wheel 104, driving force FΦ and braking force −FΦ balance out, and as a result, anti-dive force Fad is not applied to right rear wheel 104.

In other words, vehicle control apparatus 400 applies driving force FΦ to left rear wheel 103 in order to generate anti-dive force Fad, and applies driving force FΦ to right rear wheel 104. However, control apparatus 400 also applies braking force −FΦ to right rear wheel 104, so as to prevent anti-dive force Fad from being applied to right rear wheel 104 by driving force FΦ applied to right rear wheel 104.

In addition, anti-dive force Fad (Fad=FΦ·tan θf) is applied to left front wheel 101 by braking force −FΦ.

However, because neither braking force nor driving force is applied to right front wheel 102, neither anti-dive force Fad nor anti-squat force Fas is applied to right front wheel 102.

That is, in the driving and braking state illustrated in FIG. 11, while neither anti-dive force Fad nor anti-squat force Fas is applied to right front wheel 102 and right rear wheel 104, anti-dive force Fad (Fad=FΦ·tan θf) is applied to left front wheel 101, and anti-dive force Fad (Fad=FΦ·tan θr) is applied to left rear wheel 103.

Thus, when vehicle 100 is an FR vehicle, microcomputer 410 generates a roll moment by applying the longitudinal force to each of wheels 101 to 104, as illustrated in FIG. 11.

As a result, vehicle 100 can be set in a tilted state (roll attitude) in which the left side of vehicle 100 is higher than the right side of vehicle 100.

In addition, since microcomputer 410 applies driving force FΦ and braking force −FΦ to right rear wheel 104, applies braking force −FΦ to left front wheel 101, and applies driving force FΦ to left rear wheel 103, driving force FΦ and braking force −FΦ balance out on each of the right and left sides of vehicle 100.

Thus, microcomputer 410 can cause vehicle 100, which is an RF vehicle in this case, to take a roll attitude without causing longitudinal or lateral acceleration in vehicle 100.

When causing vehicle 100 to take a roll attitude in the direction opposite to that illustrated in FIG. 11, microcomputer 410 applies driving force FΦ to left rear wheel 103 and right rear wheel 104, which are the drive wheels, and applies braking force −FΦ to right front wheel 102 and left rear wheel 103.

That is, when causing an FR vehicle to a roll attitude, microcomputer 410 applies first longitudinal force in the traveling direction of vehicle 100 to a first wheel, which is one of the pair of rear wheels 103 and 104 of vehicle 100, and to a second wheel, which is the other one of the pair of rear wheels and which is connected to the first wheel by a drive shaft.

In addition, microcomputer 410 applies second longitudinal force matching the first longitudinal force in the direction opposite to the traveling direction of the vehicle to a third wheel, which is one of the pair of front wheels 101 and 102 of vehicle 100 and which is on the same side as the first wheel, and to the second wheel.

Figure 12:
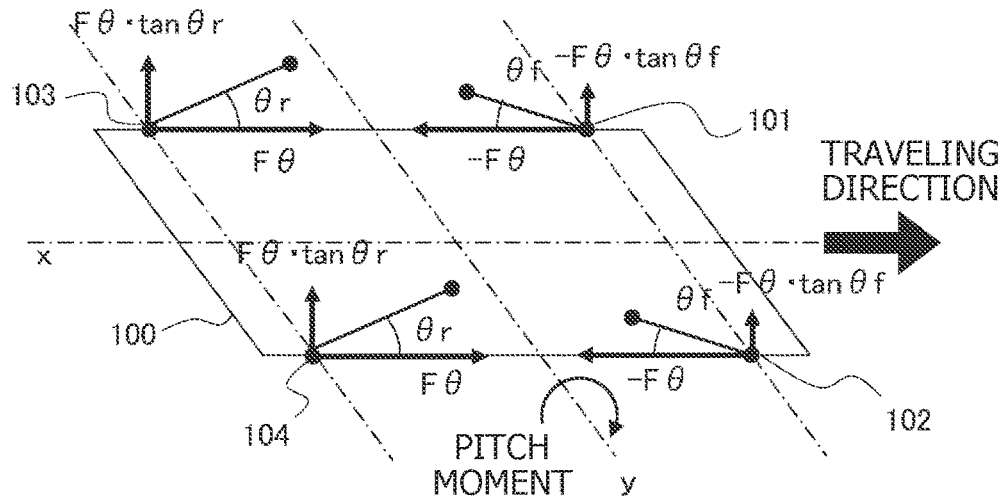
FIG. 12 illustrates a method for giving a pitch moment to an FR vehicle.

FIG. 12 illustrates a method for causing vehicle 100 to take a preliminary attitude (pitch attitude) by giving a pitch moment to vehicle 100 through control of the longitudinal force when vehicle 100 is an FR vehicle.

In this case, microcomputer 410 applies driving force Fθ to left rear wheel 102 and right rear wheel 104, which are the drive wheels, and applies braking force −Fθ to left front wheel 101 and right front wheel 102.

That is, microcomputer 410 applies first driving force in the traveling direction of vehicle 100 to a first wheel, which is one of rear wheels 103 and 104 of vehicle 100, and to a second wheel, which is the other one of rear wheels 103 and 104 and which is connected to the first wheel by a drive shaft.

In addition, microcomputer 410 applies first braking force matching the first driving force in the direction opposite to the traveling direction of the vehicle to a third wheel, which is one of front wheels 101 and 102 of vehicle 100 and which is on the same side as the first wheel, and applies second braking force matching the first driving force in the direction opposite to the traveling direction of vehicle 100 to a fourth wheel, which is the other one of front wheels 101 and 102 of vehicle 100 and which is on the same side as the second wheel.

In this case, anti-dive force Fad (Fad=Fθ·tan θr) is applied to left rear wheel 103 and right rear wheel 104 by driving force Fθ.

Similarly, anti-dive force Fad (Fad=Fθ·tan θf) is applied to left front wheel 101 and right front wheel 102 by braking force −Fθ. That is, when the FR vehicle is in the driving and braking state as illustrated in FIG. 12, as in the case in FIG. 9, because θf<θr, anti-dive force Fad applied to left front wheel 101 and right front wheel 102 is less than anti-dive force Fad applied to left rear wheel 103 and right rear wheel 104.

Thus, by applying the longitudinal force to each of wheels 101 to 104 as illustrated in FIG. 12, microcomputer 410 can give a pitch moment that lowers the front side of vehicle 100 (nosedive state).

In addition, since microcomputer 410 applies driving force FΦ to left rear wheel 103 and right rear wheel 104 and applies braking force −FΦ to left front wheel 101 and right front wheel 102, driving force FΦ and braking force −FΦ balance out on each of the right and left sides of vehicle 100.

Thus, microcomputer 410 can cause vehicle 100, which is an RF vehicle in this case, to take a pitch attitude (nosedive attitude) without causing longitudinal or lateral acceleration in vehicle 100.

Figure 13:
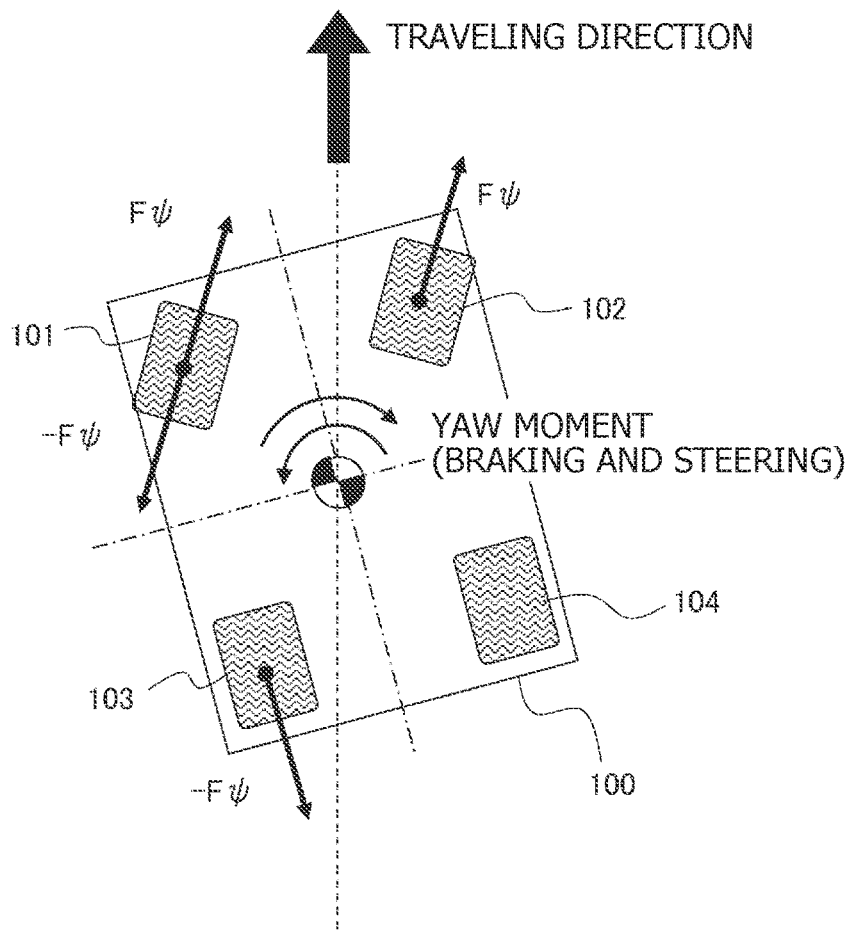
FIG. 13 illustrates a method for giving a yaw moment to a vehicle.

FIG. 13 illustrates a method for giving a yaw moment to vehicle 100, the method being implementable whether or not driving force can be independently applied to each of the four wheels.

FIG. 13 illustrates a case in which vehicle 100 is an FF vehicle or each of wheels 101 to 104 has an in-wheel motor and in which driving force can be applied to both front wheels 101 and 102.

In the case in FIG. 13, microcomputer 410 applies driving force FΨ to left front wheel 101 and right front wheel 102, and applies braking force −FΨ matching driving force FΨ to left front wheel 101 and left rear wheel 103.

When causing a yaw angle in the direction opposite to that in FIG. 13, microcomputer 410 applies driving force FΨ to left front wheel 101 and right front wheel 102, and applies braking force −FΨ to right front wheel 102 and right rear wheel 104.

By applying braking force to one side of vehicle 100, microcomputer 410 generates a yaw moment, which is the force that rotates the vehicle body about the Z axis going through the center of mass of vehicle 100 in the vertical direction.

In addition, because microcomputer 410 applies driving force FΨ to left front wheel 101 and right front wheel 102 and applies braking force −FΨ to left front wheel 101 and left rear wheel 103, driving force FΨ and the braking force balance out in overall vehicle 100, and therefore, no longitudinal or lateral acceleration is caused in vehicle 100.

As illustrated in FIG. 13, when microcomputer 410 applies braking force to the left side of vehicle 100, a yaw moment is generated in the counterclockwise direction in FIG. 13.

In this case, microcomputer 410 gives a yaw moment that cancels out the yaw moment generated by the application of the braking force by steering, that is, by controlling the steering angle (in other words, steering force), such that the traveling direction of vehicle 100 is not changed by the yaw moment generated by the application of the braking force to the one side.

As a result, microcomputer 410 can cause vehicle 100 to take a yaw attitude without changing the traveling direction of vehicle 100 and without causing longitudinal or lateral acceleration in vehicle 100.

That is, when causing vehicle 100 to take a yaw attitude, microcomputer 410 applies first driving force in the traveling direction of vehicle 100 to a first wheel, which is one of front wheels 101 and 102 of vehicle 100, and applies second driving force in the traveling direction of vehicle 100 to a second wheel, which is the other one of front wheels 101 and 102.

In addition, microcomputer 410 applies first braking force matching the first driving force in the direction opposite to the traveling direction of vehicle 100 to the first wheel, applies second braking force matching the second driving force in the direction opposite to the traveling direction of vehicle 100 to a third wheel, which is one of rear wheels 103 and 104 of vehicle 100 and which is on the same side as the first wheel, and applies steering force that causes vehicle 100 to generate a yaw moment in the direction that cancels out the yaw moment that is generated in the vehicle by the first driving force, the second driving force, the first braking force, and the second braking force.

As described above, microcomputer 410 gives a roll moment, a pitch moment, or a yaw moment to vehicle 100 before a curve by controlling the braking and driving force, in other words, the driving force in the traveling direction of vehicle 100 and the driving force in the direction opposite to the traveling direction of vehicle 100. In this way, microcomputer 410 can cause vehicle 100 to take a preliminary attitude.

When suspension device 530 is a semi-active suspension or the like and is capable of controlling damping force for each of wheels 101 to 104, microcomputer 410 in vehicle control apparatus 400 can adjust the speed of change in rotational motion (roll, pitch, yaw) of the vehicle body by controlling the damping force in parallel with the control of the braking and driving force.

Figure 14:
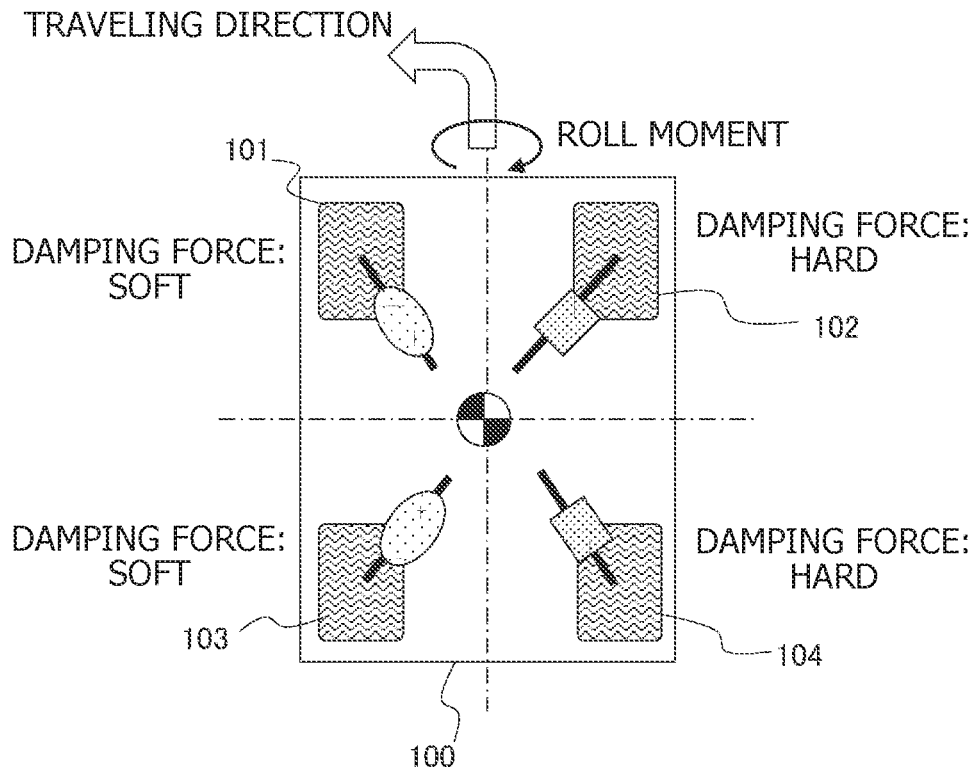
FIG. 14 illustrates control of damping force performed in parallel with control of a roll moment.

FIG. 14 illustrates an example of damping force control (in other words, output control of the damping force command) that microcomputer 410 performs in parallel with the roll moment control performed to cause vehicle 100 to take a preliminary attitude.

In the attitude control illustrated in FIG. 14, microcomputer 410 changes the roll moment such that vehicle 100 is set in a tilted state in which the left side of vehicle 100 is higher than the right side of vehicle 100 by controlling the braking and driving force as illustrated in FIG. 8, 10, or 11.

In addition, microcomputer 410 sets the damping force applied to the suspensions of right front wheel 102 and right rear wheel 104 (for example, the damping force applied to the turning outer wheels), which are on the side lowered by the above roll moment, to be greater than the damping force applied to the suspensions of left front wheel 101 and left rear wheel 104 (for example, the damping force applied to the turning inner wheels).

Microcomputer 410 can prevent the speed of increase in roll angle, the increase being associated with the generation of the roll moment, by adjusting the damping force as described above, and can consequently prevent the attitude control from giving a sense of insecurity and a sense of discomfort to passengers.

In addition, when microcomputer 410 causes vehicle 100 to take a nosedive attitude by controlling the braking and driving force as illustrated by the example in FIG. 9, microcomputer 410 sets the damping force applied to the suspensions of front wheels 101 and 102 to be greater than the damping force applied to the suspensions of rear wheels 103 and 104.

As a result, microcomputer 410 can prevent vehicle 100 from suddenly taking a nosedive attitude and can consequently prevent the attitude control from giving a sense of insecurity and a sense of discomfort to passengers.

In addition, when linking the roll moment control and the pitch moment control with each other, microcomputer 410 can adjust how the roll moment control and the pitch moment control are linked with each other (in other words, the timing) by independently adjusting the damping force applied to each of wheels 101 to 104.

Figure 15:
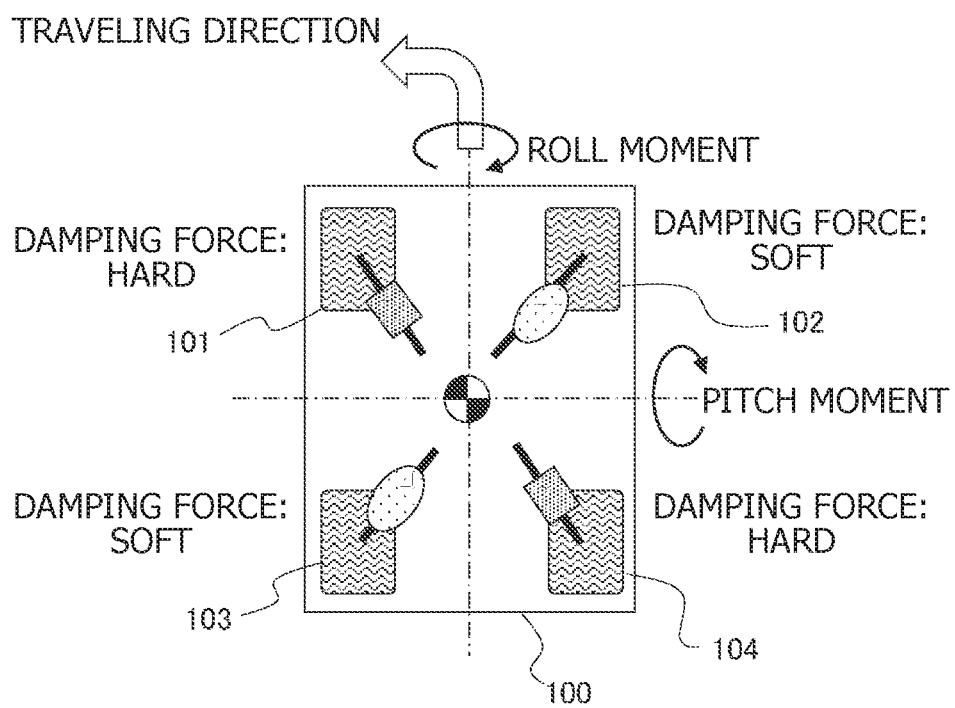
FIG. 15 illustrates an example of a damping force adjustment pattern used when control of a roll moment and control of a pitch moment are linked with each other.

FIG. 15 illustrates an example of a damping force adjustment pattern used when microcomputer 410 links the roll moment control and the pitch moment control with each other.

In this case, microcomputer 410 gives a vehicle body a roll moment that achieves a tilted state in which the left side of vehicle 100 is higher than the right side of vehicle 100 by controlling the braking and driving force per wheel, and also gives a vehicle body a pitch moment that achieves a nosedive state.

In this case, for example, as illustrated in FIG. 15, microcomputer 410 sets the damping force applied to the suspensions of left front wheel 101 and right rear wheel 104 to be greater than the damping force applied to the suspensions of right front wheel 102 and left rear wheel 103.

By performing this damping force adjustment, microcomputer 410 can simultaneously adjust the roll speed of the vehicle body based on the roll moment and the pitch speed of the vehicle body based on the pitch moment.

In addition, microcomputer 410 can monitor the roll rate and the pitch rate and adjust the damping force based on the roll rate state and pitch rate state.

Figure 16:
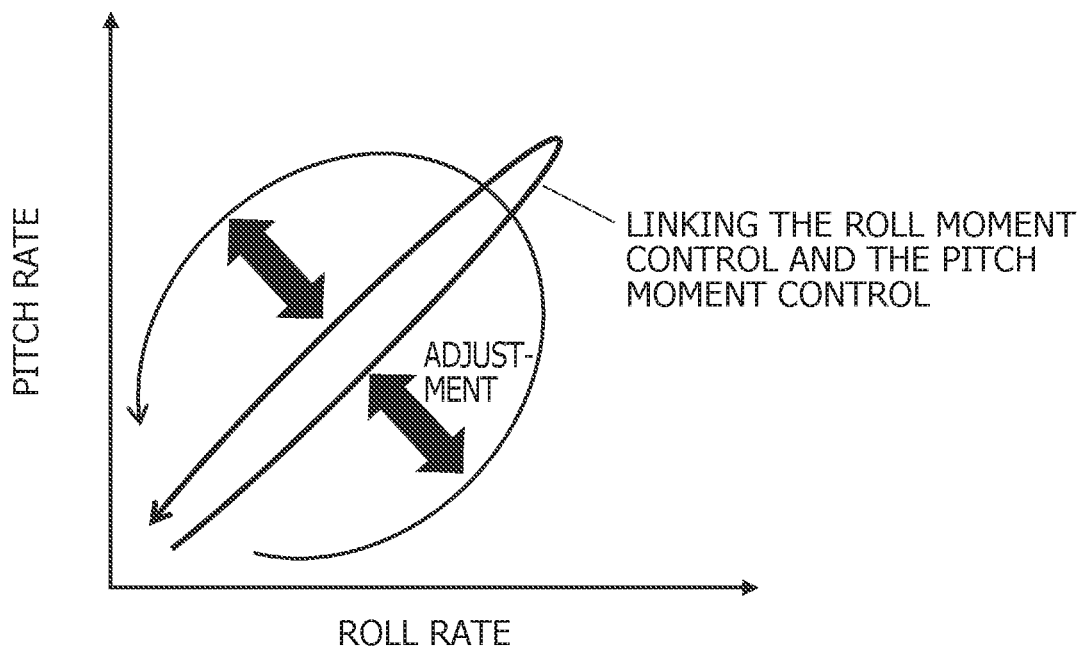
FIG. 16 illustrates a concept of damping force adjustment based on a roll rate and a pitch rate.

FIG. 16 conceptually illustrates the adjustment of the damping force based on the roll rate and the pitch rate.

When linking the roll moment control and the pitch moment control with each other, microcomputer 410 can adjust the damping force such that the roll rate is reduced preferentially as the roll rate of vehicle 100 increases, and can adjust the damping force such that the pitch rate is reduced preferentially as the pitch rate of vehicle 100 increases.

In addition, when suspension device 530 is a full-active suspension or the like, which can independently control the sprung displacement (the displacement of the vehicle body) for each of wheels 101 to 104, microcomputer 410 can control the attitude of vehicle 100 by controlling the sprung displacement for each of wheels 101 to 104.

Figure 17:
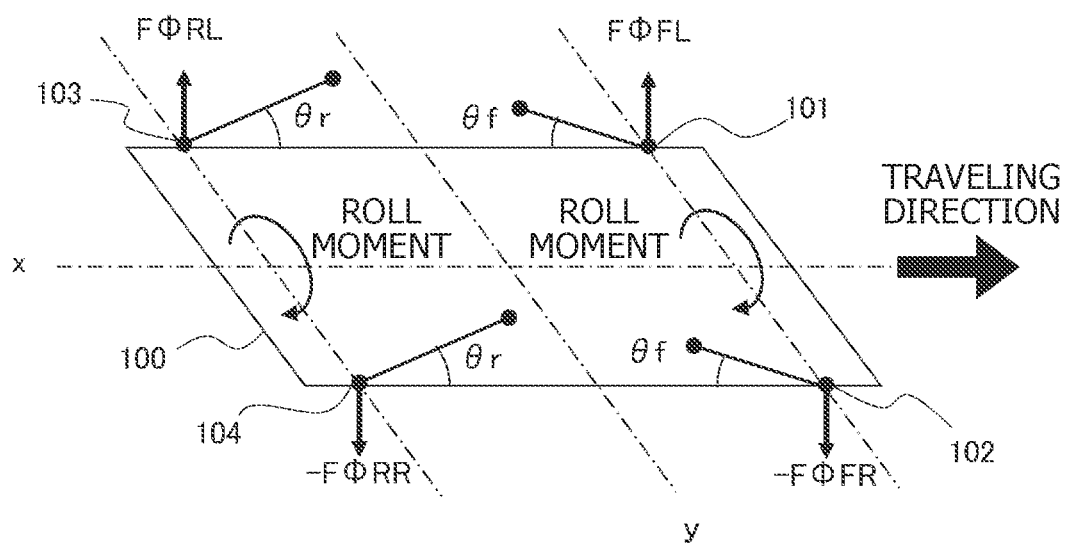
FIG. 17 illustrates a method for giving a roll moment to a vehicle body based on sprung displacement.

FIG. 17 illustrates a state in which microcomputer 410 gives a roll moment to the vehicle body by controlling the sprung displacement (in other words, by controlling the vertical force applied to the vehicle body).

In the case of the attitude control illustrated in FIG. 17, by controlling suspension device 530, microcomputer 410 applies force $F\Phi_{FL}$ and $F\Phi_{RL}$ in the direction of raising the vehicle height to left front wheel 101 and left rear wheel 103, and applies force $-F\Phi_{FR}$ and $-F\Phi_{RR}$ in the direction of lowering the vehicle height to right front wheel 102 and right rear wheel 104.

By controlling suspension device 530 in this way, microcomputer 410 can give a roll moment to the vehicle body and can set vehicle 100 in a tilted state (in other words, a roll state) in which the left side of vehicle 100 is higher than the right side of vehicle 100.

Figure 18:
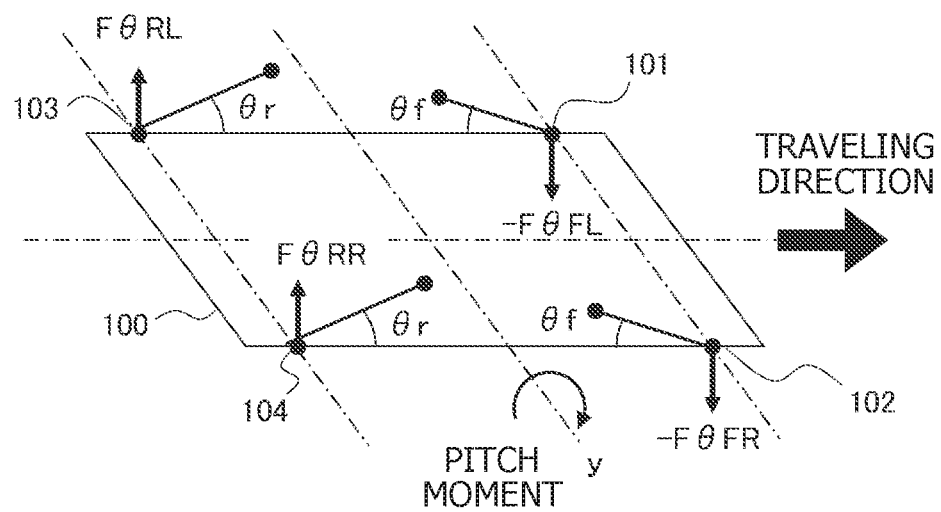
FIG. 18 illustrates a method for giving a pitch moment to a vehicle body based on sprung displacement.

FIG. 18 illustrates a state in which microcomputer 410 gives a pitch moment to the vehicle body by controlling the sprung displacement.

In the case of the attitude control illustrated in FIG. 18, by controlling suspension device 530, microcomputer 410 applies force $-F\theta_{FL}$ and $-F\theta_{FR}$ in the direction of lowering the vehicle height to left front wheel 101 and right front wheel 102, and applies force $F\theta_{RL}$ and $F\theta_{RR}$ in the direction of raising the vehicle height to left rear wheel 103 and right rear wheel 104.

By controlling suspension device 530 in this way, microcomputer 410 can give a pitch moment to vehicle 100 and can achieve a nosedive state in which the front side of vehicle 100 is lower than the rear side of vehicle 100.

In addition, microcomputer 410 can link the roll moment control based on the sprung displacement with the pitch moment control based on the sprung displacement.

For example, when linking the roll moment control illustrated in FIG. 17 with the pitch moment control illustrated in FIG. 18, microcomputer 410 sets vertical force $F_{FL}$ applied to left front wheel 101 of vehicle body, vertical force $F_{FR}$ applied to right front wheel 102 of vehicle body, vertical force $F_{RL}$ applied to left rear wheel 103 of vehicle body, and vertical force $F_{RR}$ applied to right rear wheel 104 of vehicle body, as follows.

$$F_{FL} = F\Phi_{FL} - F\theta_{FL}$$

$$F_{FR} = -F\Phi_{FR} - F\theta_{FR}$$

$$F_{RL} = F\Phi_{RL} + F\theta_{RL}$$

$$F_{RR} = -F\Phi_{RR} + F\theta_{RR}$$

That is, when linking the roll moment control based on the adjustment of the vertical force for each of wheels 101 to 104 with the pitch moment control based on the adjustment of the vertical force for each of wheels 101 to 104, microcomputer 410 sets a sum of the vertical force for controlling the roll moment and the vertical force for controlling the pitch moment, as the vertical force for the attitude control.

Hereinafter, a specific mode in which microcomputer 410 causes vehicle 100 to take a preliminary attitude before a curve will be described.

Figure 19:
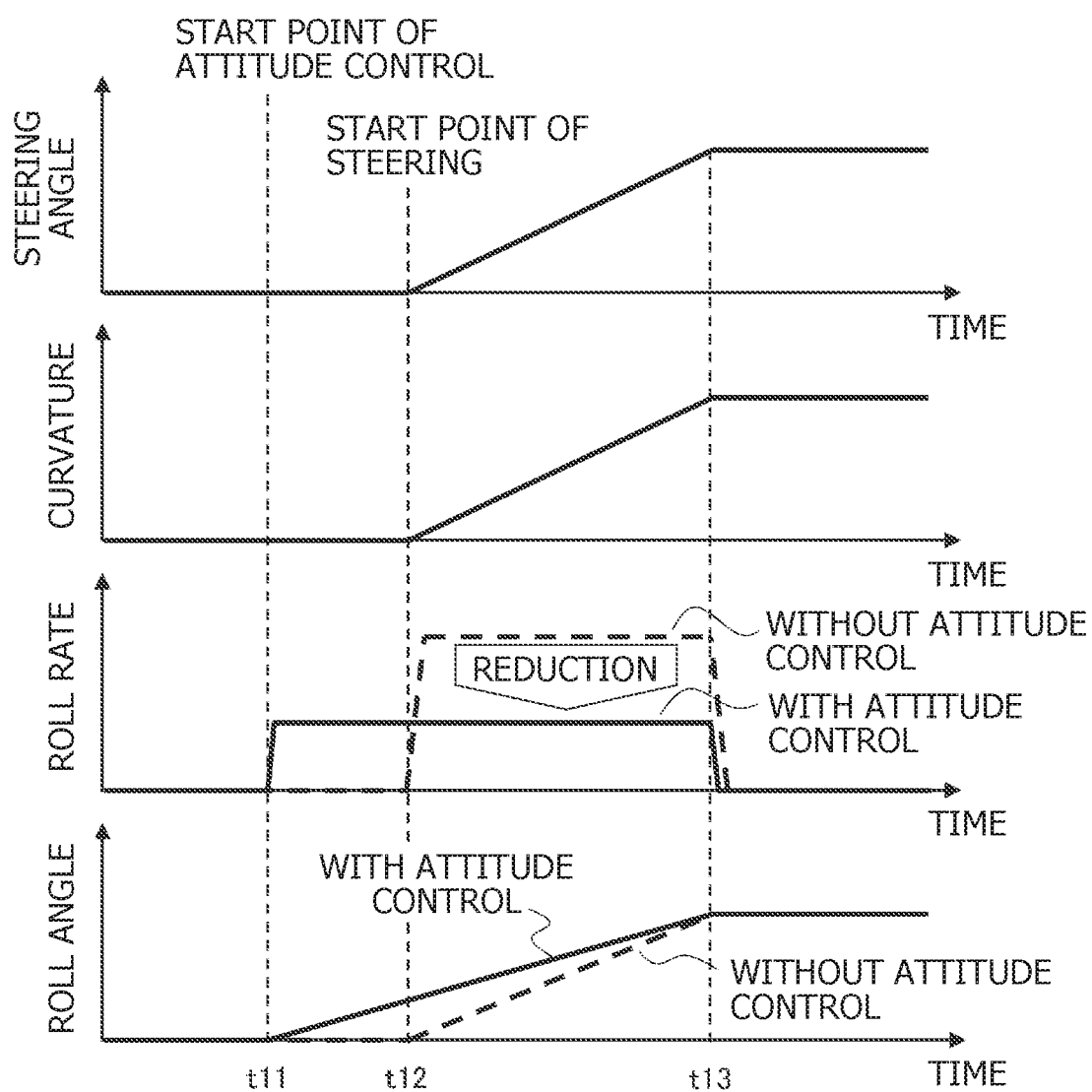
FIG. 19 is a time chart illustrating change in roll angle, roll rate, etc., in attitude control that generates a roll angle.

FIG. 19 is a time chart illustrating change in roll angle, roll rate, etc., which occurs when microcomputer 410 performs attitude control before vehicle 100 enters a curve, the attitude control generating a roll angle in the direction of the roll that is predicted to be generated when vehicle 100 runs on the curve.

At time t11, which is before time t12 at which the steering is started (in other words, before vehicle 100 enters a curve), microcomputer 410 starts the attitude control based on, for example, information about the curvature of the traveling road at the preview point.

In this case, before entering the curve, microcomputer 410 generates a roll moment that laterally tilts vehicle 100 such that the turning inner wheels are raised and the turning outer wheels are lowered, that is, such that the same tilt state caused on the curve ahead is obtained, by applying the above-described braking and driving force (see FIG. 8 or 11), for example.

Figure 20:
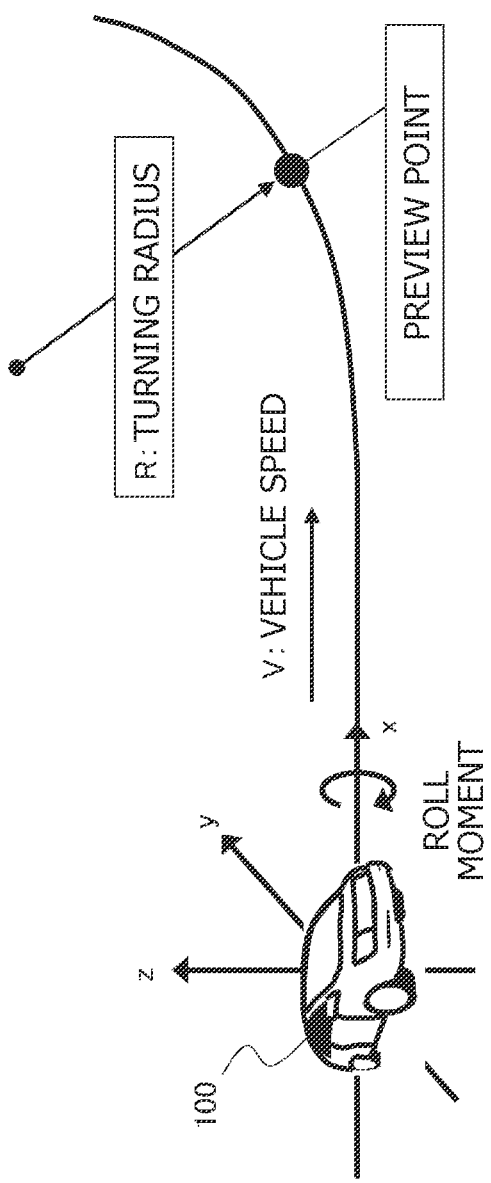
FIG. 20 illustrates a state in which a vehicle is given a roll moment in the direction of raising the turning inner wheels before a curve.

FIG. 20 illustrates a state in which microcomputer 410 gives a roll moment in the direction of raising the turning inner wheels to vehicle 100 before a curve.

By performing this attitude control, microcomputer 410 gradually increases the roll angle of vehicle 100 before vehicle 100 enters a curve until the roll angle reaches a roll angle matching the curvature of the curve and the vehicle speed finally (at time t13).

As described above, before vehicle 100 enters a curve, microcomputer 410 starts to gradually increase the roll angle until the roll angle reaches a roll angle that is predicted to occur when vehicle 100 enters the curve. That is, microcomputer 410 causes vehicle 100 to take a roll attitude as a preliminary attitude before vehicle 100 enters the curve.

By causing vehicle 100 to take a roll attitude before a curve, the passengers of vehicle 100 can recognize entering the curve in advance, and the passengers can have a sense of security.

In addition, because the roll rate during running on the curve can be reduced, passenger sway caused by the change in attitude of vehicle 100 is reduced, and passenger comfort is consequently improved.

Figure 21:
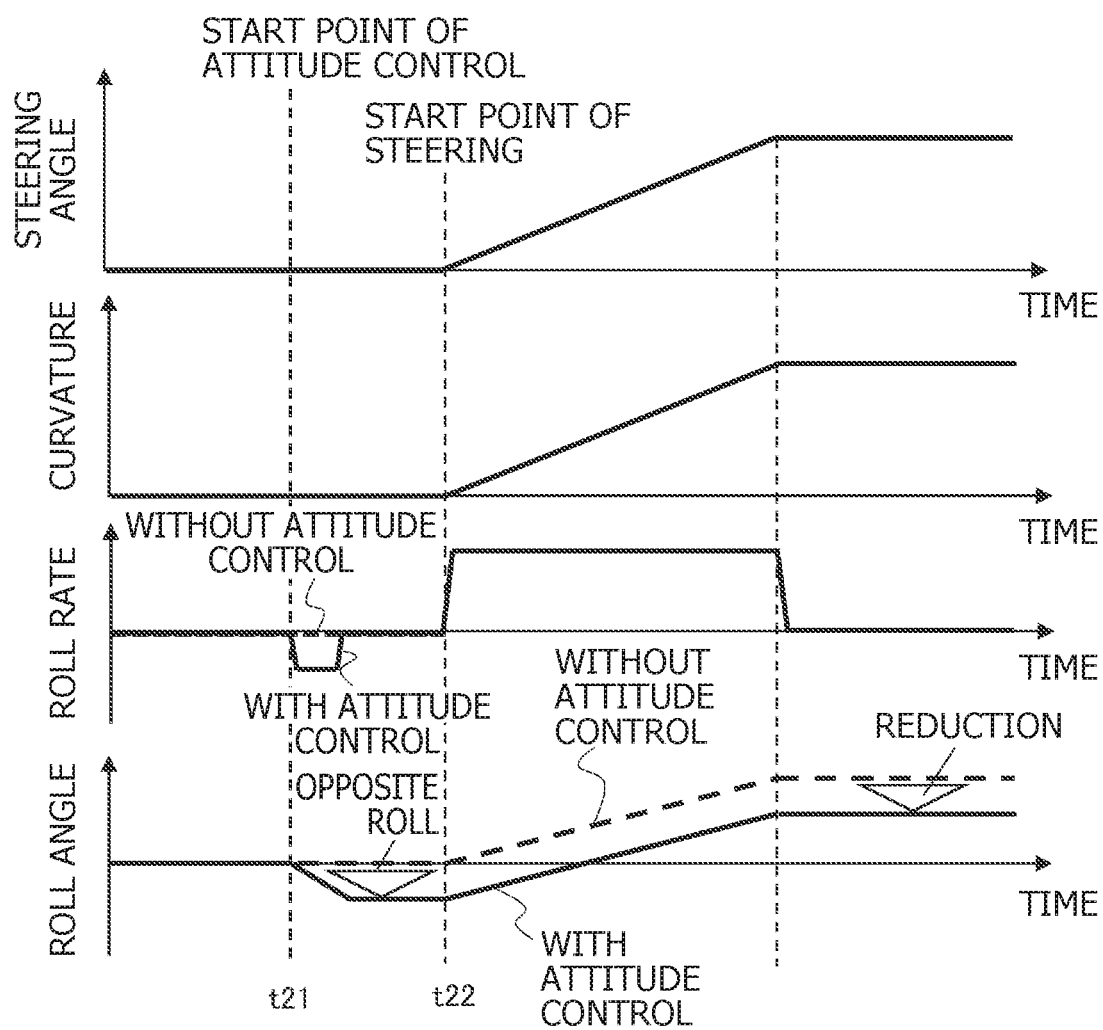
FIG. 21 is a time chart illustrating change in roll angle, etc., in attitude control that generates a roll angle in an opposite direction before a curve.

FIG. 21 is a time chart illustrating change in roll angle, etc., which occurs when microcomputer 410 performs attitude control before vehicle 100 enters a curve, the attitude control generating a roll angle in the direction opposite to the direction of the roll that is predicted to be generated when vehicle 100 runs on the curve.

At the start time of the attitude control (time t21), which is before vehicle 100 enters a curve, microcomputer 410 starts the attitude control that rolls the vehicle body in the direction opposite to the roll that is predicted to occur when vehicle 100 runs on the curve. In other words, microcomputer 410 starts the attitude control that generates the opposite roll.

Figure 22:
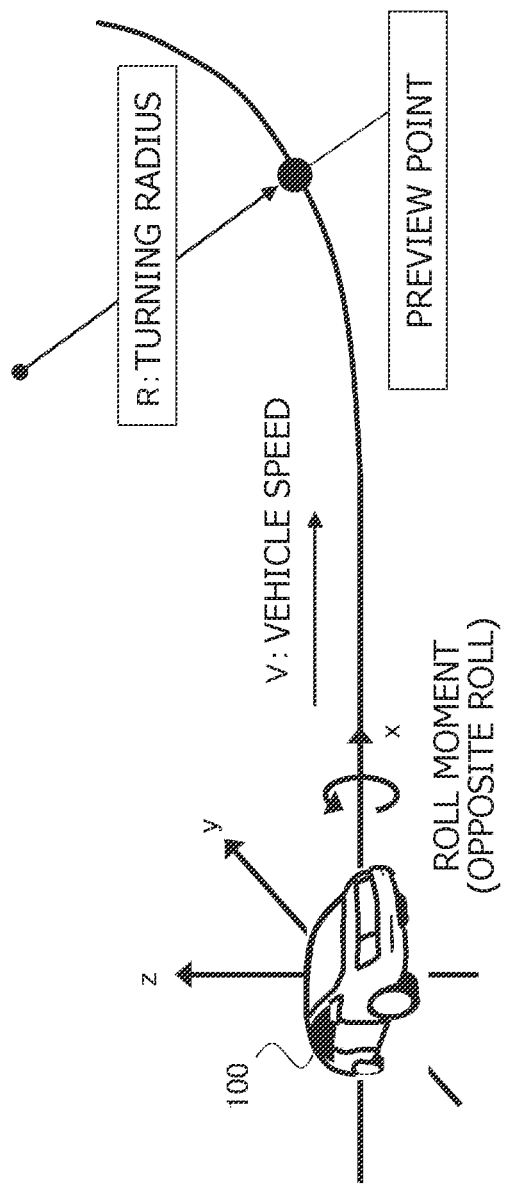
FIG. 22 illustrates a state in which a vehicle is given a roll moment in the opposite direction before the curve.

FIG. 22 illustrates a state in which microcomputer 410 gives a roll moment in the direction opposite to the direction of raising the turning inner wheels to vehicle 100 before the curve.

Next, microcomputer 410 maintains a predetermined roll angle in the opposite direction until time t22, that is, until vehicle 100 actually enters the curve (until the steering is started).

Next, after vehicle 100 actually enters the curve at time t22 (in other words, after the steering is started), microcomputer 410 gradually decreases the roll angle in the opposite direction, returns vehicle 100 to a no-roll state temporarily, and generates a roll angle that raises the turning inner wheels and lowers the turning outer wheels.

As described above, by causing vehicle 100 to take a roll attitude before vehicle 100 enters a curve, the passengers of vehicle 100 can recognize entering the curve in advance, and the passengers can have a sense of security.

In addition, by generating a roll angle in the opposite direction before vehicle 100 enters a curve, the roll angle that occurs when vehicle 100 runs on the curve is reduced. As a result, the passengers can find it easier to maintain sitting posture when vehicle 100 runs on the curve, and passenger comfort and driving operability are improved.

Figure 23:
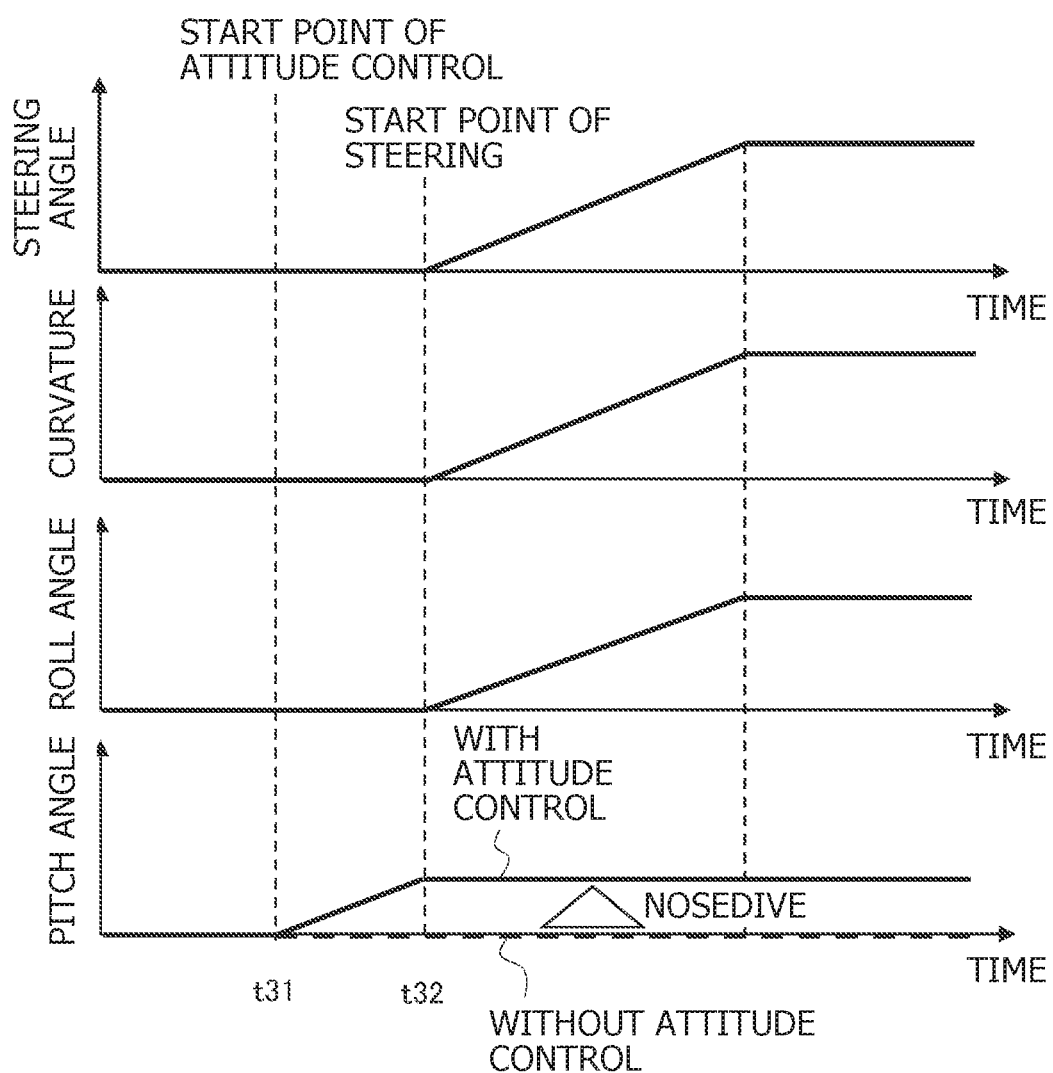
FIG. 23 is a time chart illustrating change in pitch angle, etc., in attitude control that causes a vehicle to take a nosedive attitude before a curve.

FIG. 23 is a time chart illustrating change in pitch angle, etc., which occurs when microcomputer 410 performs attitude control before vehicle 100 enters a curve, the attitude control causing vehicle 100 to take a nosedive attitude.

At the start time of the attitude control (time t31), which is before vehicle 100 enters a curve, microcomputer 410 performs the attitude control that achieves a pitch angle at which vehicle 100 is set in a nosedive state. In other words, microcomputer 410 performs control for giving a pitch moment causing nosedive (see FIG. 9, for example).

Figure 24:
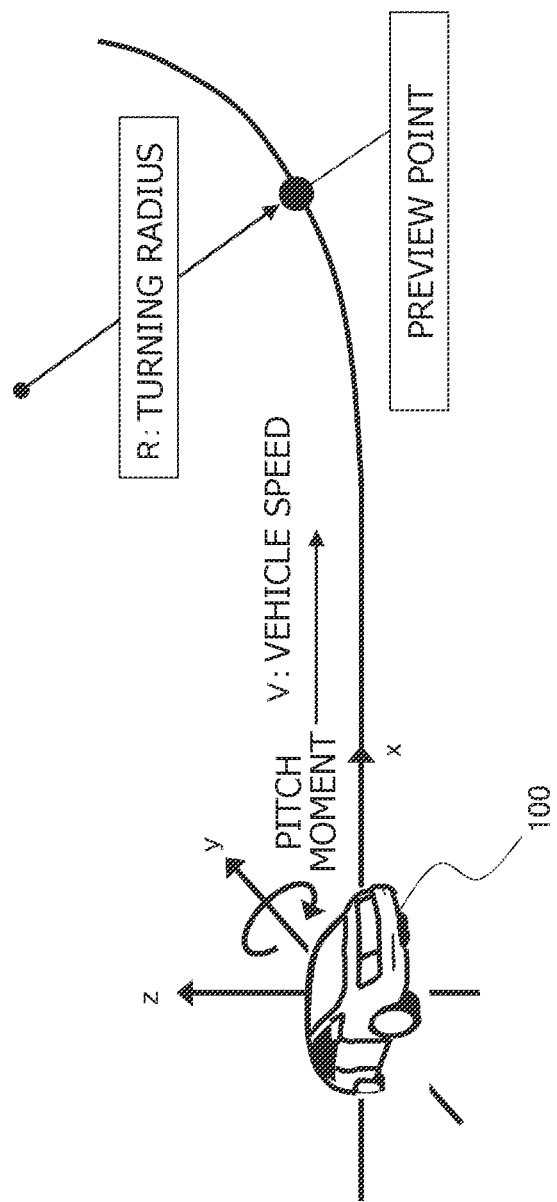
FIG. 24 illustrates a state in which the vehicle is given a pitch moment before the curve.

FIG. 24 illustrates a state in which microcomputer 410 gives vehicle 100 a pitch moment in the nosedive direction before the curve.

After actually entering the curve at time t32 (in other words, after the steering is started), microcomputer 410 maintains a predetermined pitch angle at which vehicle 100 is set in a nosedive state.

As described above, by causing vehicle 100 to take a nosedive attitude (pitch attitude) before vehicle 100 enters a curve, the passengers of vehicle 100 can recognize entering the curve in advance, and the passenger can have a sense of security.

Figure 25:
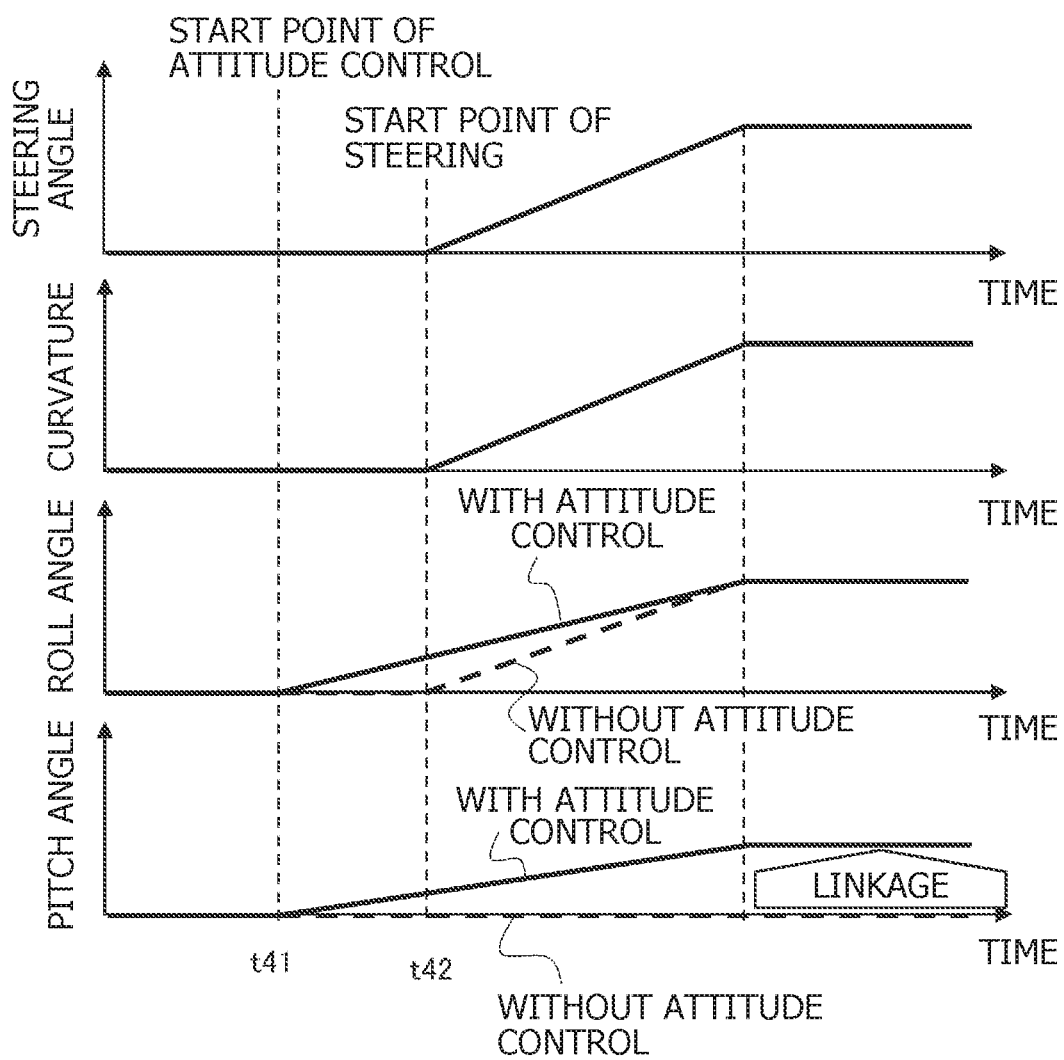
FIG. 25 is a time chart illustrating change in roll angle, pitch angle, etc., in attitude control that causes a vehicle to take a diagonal roll attitude before a curve.

FIG. 25 is a time chart illustrating change in roll angle, pitch angle, etc., which occurs when microcomputer 410 performs the attitude control that causes vehicle 100 to take a diagonal roll attitude before a curve by linking the roll moment control and the pitch moment control with each other.

The diagonal roll is a state in which a turning outer wheel of the front wheels of vehicle 100 is lowered and the rear wheel diagonal with respect to this turning outer wheel is raised.

At the start time of the attitude control (time t41), which is before vehicle 100 enters a curve, microcomputer 410 performs the attitude control that links the roll moment control and the pitch moment control with each other and realizes a diagonal roll attitude such that the turning inner and outer wheels become suitable when vehicle 100 runs on the curve ahead.

Figure 26:
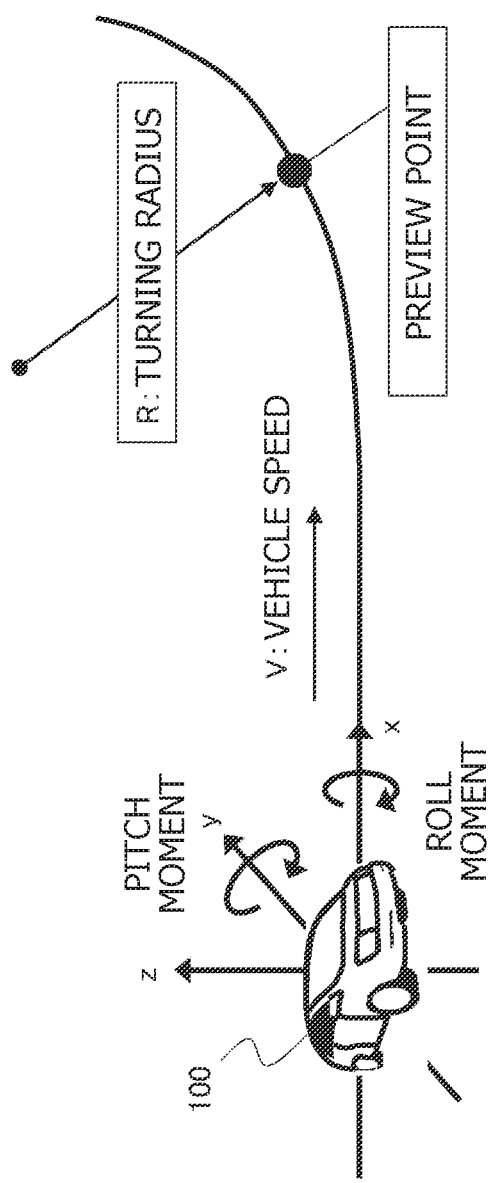
FIG. 26 illustrates a state in which the vehicle is given a roll moment and a pitch moment to cause the vehicle to take a diagonal roll attitude before the curve.

FIG. 26 illustrates a state in which microcomputer 410 gives a roll moment and a pitch moment to vehicle 100 to cause vehicle 100 to take a diagonal roll attitude before the curve.

As described above, by causing vehicle 100 to take a diagonal roll attitude before a curve, the passengers of vehicle 100 can recognize entering the curve in advance, and the passengers can have a sense of security.

In addition, because the roll rate during running on a curve can be reduced, passenger sway caused by the change in attitude of vehicle 100 is reduced, and passenger comfort is consequently improved.

In addition, by causing vehicle 100 to take a diagonal roll attitude, the behavior of vehicle 100 during running on the curve becomes smoother, and passenger security and comfort are further improved.

Figure 27:
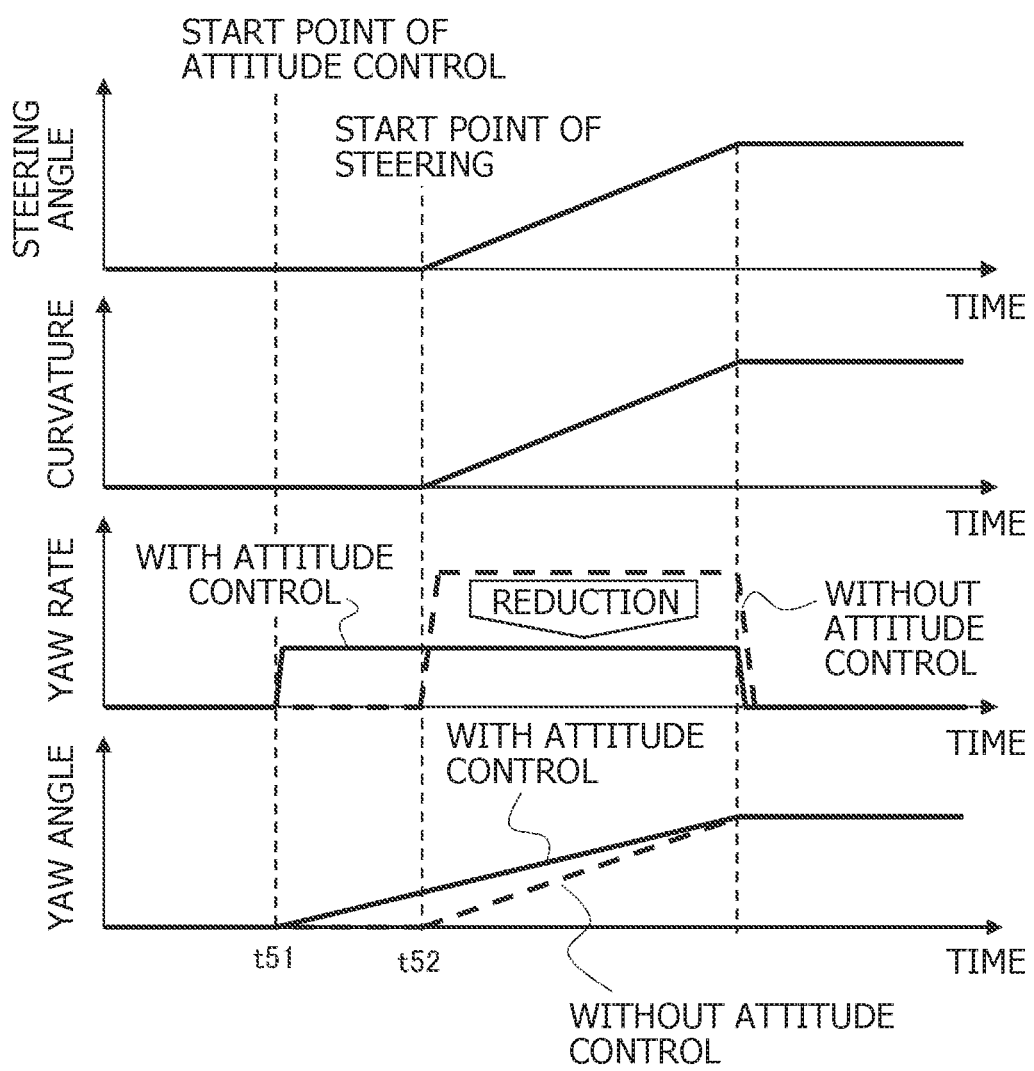
FIG. 27 is a time chart illustrating change in yaw rate, yaw angle, etc., in attitude control that generates a yaw angle before a curve.

FIG. 27 is a time chart illustrating change in yaw rate, yaw angle, etc., which occurs when microcomputer 410 performs the attitude control that generates a yaw angle in vehicle 100 before vehicle 100 enters a curve.

At time t51, which is before time t52 at which the steering is started (in other words, before vehicle 100 enters a curve), microcomputer 410 performs the control that generates a yaw moment without changing the traveling direction (see FIG. 13), and generates a yaw angle.

Figure 28:
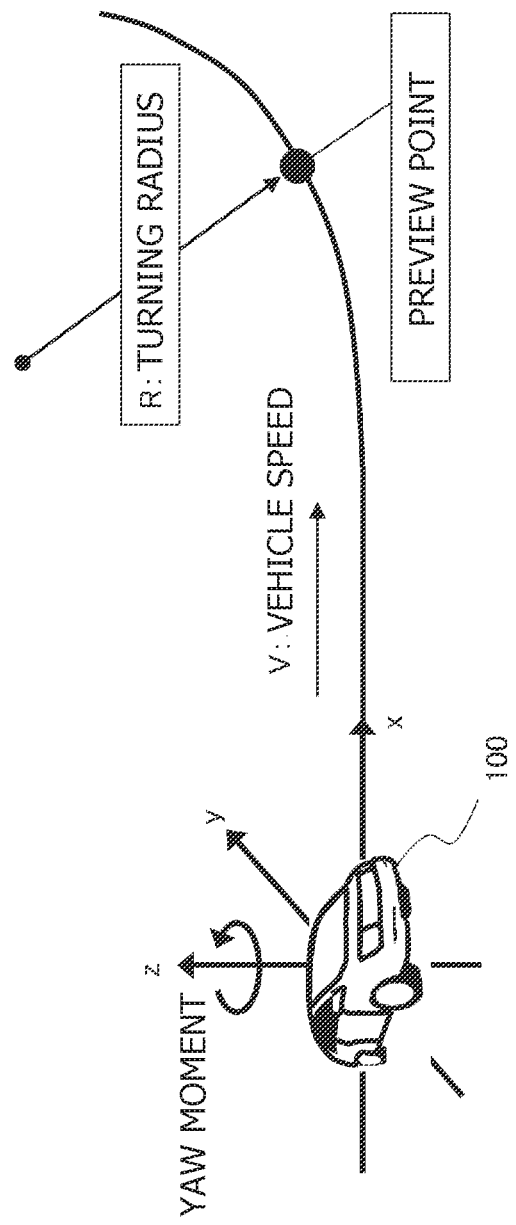
FIG. 28 illustrates a state in which the vehicle is given a yaw moment to cause the vehicle to take a yaw attitude before the curve.

FIG. 28 illustrates a state in which microcomputer 410 gives a yaw moment to vehicle 100, so as to cause vehicle 100 to take a yaw attitude before a curve.

As described above, by causing vehicle 100 to take a yaw attitude before vehicle 100 enters a curve, the yaw rate during running on the curve can be reduced, and change in the field of vision of the passengers becomes less. As a result, the burden and fatigue on the passengers are reduced.

In addition, passenger sway is reduced, and passenger comfort is consequently improved.

The advantageous effects obtained by the above-described attitude control performed by the microcomputer 410 will be summarized as follows.

1. The passengers can recognize entering a curve in advance, and can have a sense of security.
2. The roll rate during running on a curve can be reduced, and passenger sway can be reduced.
3. The roll angle during running on a curve can be reduced, and the passengers can find it easier to maintain sitting posture.
4. Because the roll rate and roll angle during running on a curve can be reduced, passenger comfort and the driver's operability are improved.

In addition, microcomputer 410 performs the above-described attitude control function without changing the longitudinal or lateral acceleration generated in vehicle 100.

In this way, because inertia that is not anticipated by the passengers is not generated by the longitudinal or lateral acceleration, the advantageous effects as described below can be obtained.

1. A sense of insecurity or a sense of discomfort are not given to the passengers.
2. The passenger ride quality and comfort are maintained.

The individual technical concepts described in the above-described example can be appropriately combined and used, as long as there is no conflict.

In addition, although the present invention has thus been described in detail with reference to a preferable example, it will be apparent to those skilled in the art that various types of modifications are possible, based on the basic technical concepts and teachings of the present invention.

The vehicle control apparatus can switch the preliminary attitude that a vehicle takes before a curve, based on at least one of information about the curvature ahead of the traveling road of the vehicle, information about the speed of the vehicle, information about the number of people in the vehicle (loading weight), information about the road gradient, information about the road bank angle, information about the continuity of the curve, information about the friction coefficient of the traveling road, and the like.

That is, the vehicle control apparatus can switch whether to generate a roll moment (roll in the forward direction, roll in the reverse direction), a pitch moment, or a yaw moment before vehicle 100 enters a curve, based on the traveling conditions of vehicle 100.

For example, when the roll rate that is predicted to occur at the preview point exceeds a threshold, the vehicle control apparatus can generate a roll moment before the curve, the roll moment that rolls vehicle 100 in the direction of the roll caused when vehicle 100 runs on the curve. In contrast, when the roll rate that is predicted to occur at the preview point is equal to or less than the threshold and when the roll angle is predicted to exceed a threshold, the vehicle control apparatus can generate a roll moment before the curve, the roll moment that rolls vehicle 100 in the direction opposite to the roll caused when vehicle 100 runs on the curve.

In addition, regarding the determination of the start of the attitude control (step S802 in FIG. 2), the vehicle control apparatus can change threshold L3 for the distance in the third start condition and/or threshold t4 for the time in the fourth start condition, based on at least one of the information about curvature Kp at the preview point, information about deviation between curvature Kp at the preview point and curvature Kv at the current location, information about which one of the roll moment, the pitch moment, the yaw moment needs to be generated before the curve, and the like.

Hereinafter, the technical concepts that can be understood from the above-described example will be described.

In one mode, there is provided a vehicle control apparatus including a control unit that outputs a result calculated based on input information.

The control unit
acquires a physical quantity about a curvature ahead on a traveling road on which a vehicle runs,
acquires a physical quantity about the speed of the vehicle, and
outputs a control command to an actuator unit that generates longitudinal force in wheels of the vehicle or that applies vertical force to the vehicle body of the vehicle, so as to generate a moment to change the attitude of the vehicle before a curve on the traveling road, based on the physical quantity about the curvature ahead and the physical quantity about the speed.

In a more preferable mode, the control unit outputs a control command to the actuator unit such that a roll moment that rolls the vehicle in the direction of the roll that occurs when the vehicle runs on the curve is generated before the curve on the traveling road.

In another preferable mode, the control unit outputs a control command to the actuator unit such that a roll moment that rolls the vehicle in the direction opposite to the direction of the roll that occurs when the vehicle runs on the curve is generated before the curve on the traveling road.

In still another preferable mode, the control unit outputs a control command to the actuator unit such that a pitch moment that causes the vehicle to take a nosedive attitude is generated before the curve on the traveling road.

In still another preferable mode, the control unit outputs a control command to the actuator unit such that a roll moment that rolls the vehicle in the direction of the roll that occurs when the vehicle runs on the curve and a pitch moment that causes the vehicle to take a nosedive attitude are generated before the curve on the traveling road.

In still another preferable mode, on each of the right and left sides of the vehicle, the control unit generates first longitudinal force in the traveling direction of the vehicle, and generates second longitudinal force matching the first longitudinal force in the direction opposite to the traveling direction of the vehicle.

In still another preferable mode, the control unit causes the vehicle to generate a first yaw moment such that the longitudinal force applied to the right wheels of the vehicle differs from that applied to the left wheels of the vehicle, and outputs a steering angle command for generating a second yaw moment in the direction of cancelling out the first yaw moment to a steering device.

In still another preferable mode, when changing the attitude of the vehicle before the curve, the control unit outputs a damping force control command for adjusting the speed in change of the attitude to a suspension device.

In still another preferable mode, before the curve on the traveling road, the control unit outputs a control command to the actuator unit such that a roll moment and a pitch moment are generated, and outputs a control command for adjusting damping force based on a roll rate and a pitch rate to a suspension device.

REFERENCE SYMBOL LIST 100 vehicle
200 vehicle control system
300 surrounding area information recognition unit
400 vehicle control apparatus (control unit)
410 microcomputer (control unit)
500 actuator unit
510 driving device
520 braking device
530 suspension device
540 steering device

The invention claimed is:

1. A vehicle control apparatus comprising:
a control unit that outputs a result calculated based on input information,
wherein the control unit
acquires a physical quantity about a curvature ahead on a traveling road on which a vehicle runs,
acquires a physical quantity about a speed of the vehicle, and
in order to change, before an occurrence of a vehicle behavior caused when the vehicle runs on a curve, an attitude of the vehicle to a preliminary attitude in preparation for running on the curve, outputs a control command for operating an actuator unit mounted in the vehicle, so as to obtain a control moment including at least one of a roll moment, a pitch moment, and a yaw moment that are generated for the vehicle before a curve on the traveling road, based on the physical quantity about the curvature ahead and the physical quantity about the speed.

2. The vehicle control apparatus according to claim 1, wherein the control command output by the control unit does not change longitudinal and lateral acceleration generated in the vehicle.

3. The vehicle control apparatus according to claim 1, wherein the control unit outputs the control command if a first condition is satisfied, the first condition indicating that the physical quantity about the curvature ahead is equal to or less than a predetermined first threshold or a difference between the physical quantity about the curvature ahead and a physical quantity about a curvature at a current location of the vehicle is equal to or greater than a predetermined second threshold, and if a second condition is satisfied, the second condition indicating that, a distance between a preview point corresponding to the curvature ahead on the traveling road and the current location of the vehicle is equal to or less than a predetermined third threshold or an estimated time of arrival at the preview point calculated based on the distance and the physical quantity about the speed of the vehicle is equal to or less than a predetermined fourth threshold.

4. The vehicle control apparatus according to claim 1, wherein the actuator unit includes a steering device, and
wherein the control unit outputs the control command if a first condition is satisfied, the first condition indicating that the physical quantity about the curvature ahead is equal to or greater than a predetermined first threshold or a difference between the physical quantity about the curvature ahead and a physical quantity about a curvature at a current location of the vehicle is equal to or greater than a predetermined second threshold, and if a third condition is satisfied, the third condition indicating that a steering angle of the steering device is within a predetermined angle or an acquired actual yaw rate of the vehicle is within a predetermined range.

5. The vehicle control apparatus according to claim 1, wherein the control moment is calculated by multiplying a difference between the physical quantity about the curvature ahead and a physical quantity about a curvature at a current location of the vehicle and the physical quantity about the speed by a control gain or is calculated based on an estimated lateral acceleration, an estimated lateral jerk, or an estimated moment calculated based on the physical quantity about the curvature ahead and the physical quantity about the speed and generated in the vehicle at a preview point corresponding to the curvature ahead on the traveling road.

6. The vehicle control apparatus according to claim 1, wherein the control command output by the control unit is for
applying first driving force in a traveling direction of the vehicle to a first wheel, which is a front wheel of the vehicle,
applying second driving force in a direction opposite to the traveling direction of the vehicle to a second wheel, which is the other one of the front wheels,
applying third driving force matching the first driving force in the direction opposite to the traveling direction of the vehicle to a third wheel, which is a rear wheel of the vehicle and which is on the same side as the first wheel, and applying fourth driving force matching the second driving force in the traveling direction of the vehicle to a fourth wheel, which is the other one of the rear wheels of the vehicle and which is on the same side as the second wheel.

7. The vehicle control apparatus according to claim 1, wherein the control command output by the control unit is for applying first driving force in a direction opposite to a traveling direction of the vehicle to a first wheel, which is a front wheel of the vehicle, applying second driving force in a direction opposite to the traveling direction of the vehicle to a second wheel, which is the other one of the front wheels, applying third driving force matching the first driving force in the traveling direction of the vehicle to a third wheel, which is a rear wheel of the vehicle and which is on the same side as the first wheel, and applying fourth driving force matching the second driving force in the traveling direction of the vehicle to a fourth wheel, which is the other one of the rear wheels of the vehicle and which is on the same side as the second wheel.

8. The vehicle control apparatus according to claim 1, wherein the control command output by the control unit is for applying first driving force in a traveling direction of the vehicle to a first wheel, which is a front wheel of the vehicle, and to a second wheel, which is the other one of the front wheels and which is connected to the first wheel by a drive shaft, applying first braking force matching the first driving force in a direction opposite to the traveling direction of the vehicle to a third wheel, which is a rear wheel of the vehicle and which is on the same side as the first wheel, and applying second braking force matching the first driving force in the direction opposite to the traveling direction of the vehicle to the second wheel.

9. The vehicle control apparatus according to claim 1, wherein the control command output by the control unit is for applying first driving force in a traveling direction of the vehicle to a first wheel, which is a rear wheel of the vehicle, and to a second wheel, which is the other one of the rear wheels and which is connected to the first wheel by a drive shaft, applying first braking force matching the first driving force in a direction opposite to the traveling direction of the vehicle to a third wheel, which is a front wheel of the vehicle and which is on the same side as the first wheel, and applying second braking force matching the first driving force in the direction opposite to the traveling direction of the vehicle to the second wheel.

10. The vehicle control apparatus according to claim 1, wherein the control command output by the control unit is for applying first driving force in a traveling direction of the vehicle to a first wheel, which is a rear wheel of the vehicle, and to a second wheel, which is the other one of the rear wheels and which is connected to the first wheel by a drive shaft, applying first braking force matching the first driving force in a direction opposite to the traveling direction of the vehicle to a third wheel, which is a front wheel of the vehicle and which is on the same side as the first wheel, and applying second braking force matching the first driving force in the direction opposite to the traveling direction of the vehicle to a fourth wheel, which is the other one of the front wheels of the vehicle and which is on the same side as the second wheel.

11. The vehicle control apparatus according to claim 1, wherein the control command output by the control unit is for applying first driving force in a traveling direction of the vehicle to a first wheel, which is a front wheel of the vehicle, applying second driving force in the traveling direction of the vehicle to a second wheel, which is the other one of the front wheels, applying first braking force matching the first driving force in a direction opposite to the traveling direction of the vehicle to the first wheel, applying second braking force matching the second driving force in the direction opposite to the traveling direction of the vehicle to a third wheel, which a rear wheel of the vehicle and which is on the same side as the first wheel, and applying steering force that causes the vehicle to generate a yaw moment in a direction of canceling out a yaw moment generated in the vehicle by the first driving force, the second driving force, the first braking force, and the second braking force.

12. The vehicle control apparatus according to claim 1, wherein the control command includes a damping force command in addition to a driving command and a braking command.

13. The vehicle control apparatus according to claim 1, wherein the actuator unit includes a suspension device, and the control unit outputs the control command to the suspension device, so as to obtain the roll moment or the pitch moment.

14. The vehicle control apparatus according to claim 1, wherein the control unit outputs a control command for generating a yaw moment without changing a traveling direction of the vehicle, so as to cause the vehicle to take a yaw attitude, as the preliminary attitude, before the curve on the traveling road.

15. The vehicle control apparatus according to claim 1, wherein the control unit outputs a control command for generating a roll moment that rolls the vehicle in a direction of a roll that occurs when the vehicle runs on the curve, so as to cause the vehicle to take a roll attitude, as the preliminary attitude, before the curve on the traveling road.

16. The vehicle control apparatus according to claim 1, wherein the control unit outputs a control command for generating a roll moment that rolls the vehicle in a direction opposite to a direction of a roll that occurs when the vehicle runs on the curve, so as to cause the vehicle to take a roll attitude, as the preliminary attitude, before the curve on the traveling road.

17. The vehicle control apparatus according to claim 1, wherein the control unit outputs a control command for generating a pitch moment that causes the vehicle to achieve a nosedive state, so as to cause the vehicle to take a nosedive attitude, as the preliminary attitude, before the curve on the traveling road.

18. The vehicle control apparatus according to claim 1, wherein
the actuator unit includes a suspension device, and
when changing the attitude of the vehicle before the curve, the control unit outputs a damping force control command for adjusting the speed in change of the attitude to the suspension device.

19. A vehicle control method executed by a control unit mounted in a vehicle, the vehicle control method comprising:
acquiring a physical quantity about a curvature ahead on a traveling road on which the vehicle runs;
acquiring a physical quantity about a speed of the vehicle; and
in order to change, before an occurrence of a vehicle behavior caused when the vehicle runs on a curve, an attitude of the vehicle to a preliminary attitude in preparation for running on the curve, outputting a control command for operating an actuator unit mounted in the vehicle, so as to obtain a control moment including at least one of a roll moment, a pitch moment, and a yaw moment that are generated for the vehicle before a curve on the traveling road, based on the physical quantity about the curvature ahead and the physical quantity about the speed.

20. A vehicle control system comprising:
a surrounding area information recognition unit that acquires information about a surrounding area ahead on a traveling road on which a vehicle runs;
an actuator unit that controls an attitude of the vehicle; and
a control unit that outputs a result calculated based on input information,
wherein the control unit
acquires a physical quantity about a curvature ahead on the traveling road on which the vehicle runs based on the information about the surrounding area,
acquires a physical quantity about a speed of the vehicle, and
in order to change, before an occurrence of a vehicle behavior caused when the vehicle runs on a curve, the attitude of the vehicle to a preliminary attitude in preparation for running on the curve, outputs a control command for operating the actuator unit, so as to obtain a control moment including at least one of a roll moment, a pitch moment, and a yaw moment that are generated for the vehicle before a curve on the traveling road, based on the physical quantity about the curvature ahead and the physical quantity about the speed.

* * * * *